(12) United States Patent
Matsuzaki

(10) Patent No.: US 8,437,226 B2
(45) Date of Patent: *May 7, 2013

(54) TIMEKEEPING DEVICE AND SATELLITE SIGNAL RECEPTION METHOD FOR A TIMEKEEPING DEVICE

(75) Inventor: Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,140

(22) Filed: Jan. 9, 2012

(65) Prior Publication Data

US 2012/0170425 A1 Jul. 5, 2012

Related U.S. Application Data

(63) Continuation of application No. 12/332,162, filed on Dec. 10, 2008, now Pat. No. 8,116,170.

(30) Foreign Application Priority Data

Dec. 19, 2007 (JP) .................................. 2007-327093
Jan. 25, 2008 (JP) .................................. 2008-014848

(51) Int. Cl.
*G04C 11/02* (2006.01)
*G01S 19/32* (2010.01)
*G01S 19/34* (2010.01)

(52) U.S. Cl.
USPC ..................... 368/47; 342/357.72; 342/357.74

(58) Field of Classification Search ..................... 368/10, 368/14, 47; 342/357.4, 357.65, 357.67, 357.72, 342/357.74
See application file for complete search history.

(56) References Cited

U.S. PATENT DOCUMENTS

| 6,212,133 | B1 | 4/2001 | McCoy et al. |
| 6,650,288 | B1 | 11/2003 | Pitt et al. |
| 7,148,844 | B2 | 12/2006 | Salkhi |
| 7,317,418 | B2 | 1/2008 | Salkhi |
| 7,436,357 | B2 | 10/2008 | Wang et al. |
| 7,457,203 | B2 | 11/2008 | Nakagawa |
| 7,570,208 | B2 | 8/2009 | Wang et al. |
| 7,623,067 | B2 | 11/2009 | Raman et al. |
| 8,116,170 | B2 | 2/2012 | Matsuzaki |
| 2006/0114151 | A1 | 6/2006 | Iwami |
| 2006/0214847 | A1 | 9/2006 | McBurney et al. |
| 2007/0152878 | A1 | 7/2007 | Wang et al. |
| 2007/0210957 | A1 | 9/2007 | Brodie et al. |
| 2007/0241959 | A1 | 10/2007 | Nakagawa |
| 2008/0025151 | A1 | 1/2008 | Urano et al. |
| 2008/0030403 | A1 | 2/2008 | Honda et al. |
| 2008/0175105 | A1 | 7/2008 | Urano et al. |
| 2009/0034371 | A1 | 2/2009 | Matsuzaki |
| 2009/0034372 | A1 | 2/2009 | Fujisawa |
| 2011/0044137 | A1 | 2/2011 | Matsuzaki |

FOREIGN PATENT DOCUMENTS

| EP | 0 451 607 A2 | 10/1991 |
| EP | 1 287 375 B1 | 4/2007 |
| EP | 1 884 753 A1 | 2/2008 |
| EP | 2 063 329 A1 | 5/2009 |
| EP | 2 073 081 A1 | 6/2009 |
| JP | 10-010251 A | 1/1998 |
| JP | 2003-149315 A | 5/2003 |

(Continued)

*Primary Examiner* — Vit W Miska

(57) ABSTRACT

A timekeeping device has a reception unit that receives a satellite signal transmitted from a positioning information satellite, a time information generating unit that generates time information based on the received satellite signal, a time display unit that displays the time information, and a reception control unit that controls the reception unit. The reception control unit includes a signal condition detection unit that detects a signal condition of the received satellite signal, and a reception setting unit that sets the reception unit to a single satellite mode or a multi-satellite mode based on the detected signal condition.

7 Claims, 15 Drawing Sheets

TIMEKEEPING DEVICE AND SATELLITE SIGNAL RECEPTION METHOD FOR A TIMEKEEPING DEVICE

CROSS-REFERENCE TO RELATED APPLICATIONS

This application is a continuation of, and claims priority under 35 U.S.C. §120 on, U.S. application Ser. No. 12/332,162, filed on Dec. 10, 2008. This application also claims priority under 35 U.S.C. §119 on Japanese Patent application Nos. 2007-327093 and 2008-014848, filed Dec. 19, 2007 and Jan. 25, 2008, respectively. The content of each such related application is incorporated by reference herein in its entirety.

BACKGROUND

1. Field of Invention

The present invention relates to a timekeeping device and to a satellite signal reception method for a timekeeping device that acquires the current date and time by receiving radio signals transmitted from positioning satellites such as GPS satellites.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the GPS time or satellite time information) with extremely high precision.

A radio-controlled timepiece that adjusts the time using time information (GPS time) from GPS satellites is taught, for example, in Japanese Unexamined Patent Appl. Pub. JP-A-H10-10251.

The signals (navigation message) from the GPS satellites are transmitted in frames and subframes synchronized to a Coarse Acquisition code (C/A code) that is reset at the beginning of the week of the GPS time. If the navigation message can be interpreted using this C/A code, the time passed since the beginning of the week in GPS time can be known from the signal from a single satellite, and the time can be set to a precision of approximately 0.1 second.

More specifically, the GPS satellites orbit at an altitude of approximately 20,000-27,000 km. It therefore takes approximately 66.6-90 ms for signals to travel from the GPS satellite to the GPS receiver. By correcting for this transmission time, the time can be synchronized to the Coordinated Universal Time (UTC) with error on the millisecond order, and a timepiece with sufficient practical precision can be achieved.

The electronic timepiece taught in Japanese Unexamined Patent Appl. Pub. JP-A-H10-10251 is a timepiece such as a table clock or a wall clock that is used in a fixed position, and assumes that signals from the GPS satellite are also received at a fixed position. Furthermore, because a GPS satellite orbits the Earth once approximately every 12 hours, which GPS satellites can be received at the present time can be determined and selectively captured by referencing the satellite history and orbit information from the last time satellite signals were received, and the satellite signals can therefore be received quickly and reliably.

When the timepiece is worn by the user, such as a wristwatch, however, signals are received while the timepiece is being worn and therefore may be moving, and signals may be received while indoors. Compared with timepieces that are used in a fixed location, there is a greater possibility that satellite signal reception by timepieces that are worn will be manually triggered by the user. It is therefore likely that the time and location where a portable timepiece such as a wristwatch executes the satellite signal reception process will be different from the previous reception process, and the previous satellite signal reception history can therefore not be used effectively.

In addition, because the amount of memory that can be provided in a portable timepiece such as a wristwatch is limited, it can be difficult to store a sufficient reception history and orbit information for each satellite, and this further limits using the reception history effectively.

As a result, a wristwatch that can receive signals from GPS satellites must typically start the satellite search from a cold start condition, that is, a condition in which there is no locally stored satellite orbit information.

This means that the GPS receiver must search indiscriminately for a GPS satellite in order to receive the time information. If the navigation data (NAV data) can be decoded from the first GPS satellite captured in this search process, the reception time can be shortened and power consumption can be reduced.

However, if the signal from the captured GPS satellite is weak, the user of the GPS receiver changes course, or the GPS satellite becomes hidden by a tall building while the signal is being received and the GPS receiver is moving, there is a strong possibility that signal reception from the captured satellite will be interrupted. It then becomes necessary to search for a GPS satellite again, thereby increasing the total reception time and increasing power consumption.

SUMMARY OF INVENTION

A timekeeping device and a satellite signal reception method for a timekeeping device according to the present invention enable receiving satellite signals in a short time, reducing power consumption, reducing the effect of the reception environment, and increasing the probability of successful reception.

A first aspect of the invention is a timekeeping device having a reception unit that receives a satellite signal transmitted from a positioning information satellite; a time information generating unit that generates time information based on the satellite signal received by the reception unit; a time display unit that displays the time information; and a reception control unit that controls the reception unit. The reception control unit includes a signal condition detection unit that detects the signal condition of the received satellite signal; and a reception (channel) setting unit that sets the reception unit to a single satellite mode or a multi-satellite or multi-channel mode based on the signal condition detected by the signal condition detection unit. Optionally, the reception unit sets the number of positioning information satellites that can be simultaneously captured and decoded to 1 when set to the single satellite mode, and sets the number of positioning information satellites that can be simultaneously captured and decoded to more than 1 when set to the multi-channel mode. Additional features that may be implemented are described below.

When the reception unit captures a positioning information satellite, the reception channel setting unit sets the reception unit to a single satellite mode for capturing a single positioning information satellite or a multi-channel mode for capturing a plurality of positioning information satellites. As a result, a satellite signal can be captured in a short time, power consumption can be reduced, the effect of the reception environment can be reduced, and the probability of successful satellite signal reception can be improved.

More specifically, if the signal condition detected by the signal condition detection unit is the signal strength (reception level), for example, and the signal strength is high, the time information can be decoded and acquired even if only one positioning information satellite is captured in the single satellite mode. More particularly, if the reception environment is good and the signal strength is high in the single satellite mode, the time and week number information can be acquired in a short time and power consumption can be reduced. However, if only the single satellite mode is used, the probability of acquiring the time and week number information drops even when the reception environment deteriorates and the signal strength drops, the satellite search process and navigation data decoding process must therefore be repeated, the reception time thus increases, and power consumption increases.

If the reception process runs only in the multi-channel mode, power consumption increases compared with the single satellite mode when the reception environment is good. However, when the reception environment is poor and the signal strength is weak, the probability of time and week number information acquisition improves and the reception time is shorter than in the single satellite mode, and power consumption can be reduced.

Therefore, by selecting the single satellite mode or the multi-channel mode according to the signal condition, the invention can shorten the average reception time and reduce power consumption, and even when the reception environment deteriorates can increase the probability of being able to acquire the time and week number information, reduce the effect of the reception environment, and improve the probability of successful reception.

Preferably, the reception channel setting unit sets the reception unit to the single satellite mode at the start of reception and captures one positioning information satellite, detects the signal condition of the positioning information satellite captured in the single satellite mode by means of the signal condition detection unit, and then based on the detected signal condition continues processing in the single satellite mode or switches from the single satellite mode to the multi-channel mode.

This aspect of the invention starts reception in the single satellite mode and then switches from the single satellite mode to the multi-channel mode based on the detected signal condition, and can therefore continue with the satellite capture and signal decoding process in the single satellite mode if the signal condition is good. The time and week information can therefore be acquired in a short time, and power consumption can be reduced.

However, if the signal condition is not good, operation switches to the multi-channel mode to capture and decode signals from a plurality of positioning information satellites. The probability of being able to acquire the time and week number information can therefore be improved, the reception time can be shortened, and power consumption can be reduced.

In another aspect of the invention the reception channel count setting unit switches to the multi-channel mode if the signal strength of the captured positioning information satellite is less than a set threshold level when the reception unit is set to the single satellite mode.

This aspect of the invention enables appropriately selecting the single satellite mode and the multi-channel mode because it switches from the single satellite mode to the multi-channel mode based on the strength of the signal received from the captured positioning information satellite. The probability of being able to acquire the time and week number information can therefore be improved, the reception time can be shortened, and power consumption can be reduced.

In another aspect of the invention the reception channel count setting unit sets the reception channel count in the multi-channel mode based on the signals strength of the captured positioning information satellite.

If the signal strength (reception level) is greater than or equal to −133 dBm, the single satellite mode is used for processing. However, if the reception level is −137 dBm to −133 dBm, the multi-channel mode is selected, the satellite capture count is set to half the number of satellites that can be captured simultaneously (for example, if an eight channel reception unit that can simultaneously capture 8 satellites is used, the satellite capture count is set to half that or 4 satellites), and if the reception level is less than −137 dBm, the satellite capture count is set to the maximum number of satellites that can be captured simultaneously (8 if an 8-channel reception unit is used).

Because the number of simultaneously captured satellites is set to a smaller number in the multi-channel mode when the signal strength is relatively high in this aspect of the invention, power consumption can be reduced accordingly. The probability of being able to decode the satellite signal even though the number of captured satellites is smaller can also be increased because the signal strength is relatively high.

However, because the number of simultaneously captured satellites is increased in the multi-channel mode when the signal strength is relatively weak, the probability of being able to decode the signal can be increased, and the need to repeat the satellite search and signal decoding process can be eliminated.

This aspect of the invention thus adjusts the number of reception channels used according to the signal strength, and can therefore improve the average probability of time and week number information acquisition, shorten the reception time, and reduce power consumption.

Note that 1 mW equals 0 dBm, and −130 dBm=1×10-13 mW.

In another aspect of the invention the reception channel setting unit switches to the multi-channel mode if the signal strength of the captured positioning information satellite is greater than or equal to the set threshold level when the reception unit is set to the single satellite mode but the time information could not be decoded from the satellite signal within a predetermined decoding time-out determination time.

This aspect of the invention determines if the decoding process has timed out within the decoding time-out determination time when in the single satellite mode, and thus eliminates unnecessary processing. More specifically, when the timekeeping device is a device such as a wristwatch that is worn by the user and thus moves around, the signal strength may be high when the satellite is captured but the signal strength may drop and the signal may not be decodable when the time information is decoded because the captured satellite has become hidden by a building. If the decoding process continues until a signal can be received from the captured satellite in this situation, power consumption increases and it may not be possible to acquire the time information.

However, because this aspect of the invention switches to the multi-channel mode and continues processing if the decoding process times out in the single satellite mode, a different satellite can be captured and the possibility of being able to acquire the time information increases.

Therefore, the probability of being able to acquire the time and week number information can be improved, the reception time can be shortened, and power consumption can be reduced.

Yet further preferably, the reception channel setting unit sets the decoding time-out determination time according to the signal strength of the captured positioning information satellite.

With this aspect of the invention the decoding time-out determination time can be shortened in the single satellite mode when the signal strength (reception level) is greater than −133 dBm, and the decoding time-out determination time can be increased when the reception level is −137 dBm to −133 dBm.

The decoding time-out determination time can be further adjusted according to the type of time information acquired. For example, when the positioning information satellite is a GPS satellite, the time information includes Z count data, which is the time passed since the beginning of the week, and a week number value that identifies the week, and it is sufficient to receive the week number only once a week. Therefore, if only the Z count data is acquired and the decoding time-out determination time may be set to 12 seconds to set a short decoding time-out determination time, and may be set to 24 seconds to set a long decoding time-out determination time, for example. If both the Z count data and the week number are acquired, the decoding time-out determination time may be set to 60 seconds when set short and 120 seconds when set long, for example.

Because this aspect of the invention sets the decoding time-out determination time according to the signal strength, whether the decoding process has timed out can be determined more quickly and accurately, continuing reception unnecessarily can be prevented, and power consumption can be reduced.

In another aspect of the invention the reception channel setting unit switches to the multi-channel mode if variation in the signal strength exceeds a set range while decoding the satellite signal when the reception unit is set to the single satellite mode even if the signal strength of the captured positioning information satellite is greater than or equal to the set threshold level.

This aspect of the invention determines if the variation in the signal strength exceeds a predetermined range, and can therefore determine if acquiring the time and week number information is difficult without waiting for decoding to time out when, for example, the captured positioning information satellite becomes hidden by a building and the strength of the received signal drops. The probability of being able to acquire the time and week number information can be improved in this situation because operation switches to the multi-channel mode and processing continues.

In another aspect of the invention the satellite capture control unit sets the positioning information satellite capture frequency to a plurality of ranges and captures positioning information satellites in each frequency range when the reception unit is set to the multi-channel mode.

If the positioning information satellites are captured in a plurality of frequency ranges, the reception unit can search for positioning information satellites at high, middle, and low elevation angles. As a result, if access to the zenith is blocked by a roof, for example, the time information may be acquired by capturing a positioning information satellite located at a lower elevation angle between the zenith and the horizon. There are thus fewer limitations on the location from which satellite signals can be received, the probability of being able to receive a signal can be improved, and power consumption can be reduced.

In addition, when the clock signal is offset, signals can be received from positioning information satellites at middle and high elevation angles instead of only from positioning information satellites at low elevation angles, the probability of being able to capture a satellite and acquire the time information can be improved, and power consumption can be reduced.

In another aspect of the invention the satellite capture control unit ends the satellite capture process when the set number of positioning information satellites is captured or the signal strength of the captured positioning information satellite is greater than or equal to the set threshold level when the reception unit is set to the multi-channel mode, and the decoding control unit causes decoding of the satellite signal from the captured positioning information satellite after the satellite capture process ends.

This aspect of the invention ends the satellite capture process and decodes the satellite signal when the set number of positioning information satellites are captured in the multi-channel mode, and can therefore improve the probability of being able to decode the satellite signal even if the signal strength of the captured satellite is less than or equal to the predetermined threshold level.

In addition, because the satellite capture process is terminated and the satellite signal is decoded if the signal strength is greater than or equal to the threshold level but the number of captured positioning information satellites is less than the set number when in the multi-channel mode, the satellite signal can be decoded even if the satellite capture count is low, the time and week number information acquisition time can be shortened, and power consumption can be reduced.

In another aspect of the invention the satellite capture control unit executes the positioning information satellite capture process on each reception channel when the reception unit is set to the multi-channel mode, the decoding control unit applies the decoding process to the satellite signal from the captured positioning information satellite, and determines if time information was decoded and acquired, and the satellite capture control unit ends the satellite capture process if the time information is decoded and acquired on any reception channel.

This aspect of the invention ends the satellite capture process in the multi-channel mode when the time information is successfully decoded from the satellite signal received from the captured positioning information satellite, therefore does not need to capture the set number of positioning information satellites, and can thus shorten the time and week number information acquisition process time and thereby reduce power consumption.

A timekeeping device according to another aspect of the invention also has an internal time information generating unit that generates internal time information, and a time information adjusting unit that adjusts the internal time information. The time information adjusting unit adjusts the internal time information based on the time information that is generated by the time information generating unit based on the satellite signal received by the reception unit.

This aspect of the invention can receive the satellite signal in a short time, reduce power consumption, reduce the effect of the reception environment, and improve the probability of successful reception.

A timekeeping device according to this aspect of the invention can therefore set the correct time based on the satellite signal from the positioning information satellite, can reduce power consumption, increase battery life, and thus enable using a smaller battery. This aspect of the invention is thus particularly well suited to portable timepieces such as wristwatches and pocket watches.

Another aspect of the invention is a timekeeping device having a reception unit that captures a positioning information satellite and receives satellite signals transmitted from the captured positioning information satellite, a time information generating unit that generates time information based on the satellite signal received by the reception unit, a time display unit that displays time information, and a reception control unit that controls the reception unit. The reception control unit includes an evaluation unit that evaluates the reception environment of the timekeeping device before the reception process executes, and a search mode selection unit that selects a single satellite search mode or a plural satellite search mode based on the result from the evaluation unit when the reception unit runs the reception process. The single satellite search mode is a mode for capturing one positioning information satellite and acquiring time information based on the satellite signal transmitted from the captured positioning information satellite, and the plural satellite search mode is a mode for capturing a plurality of positioning information satellites and acquiring time information based on the satellite signal transmitted from one of the plural captured positioning information satellites.

The evaluation unit in this aspect of the invention evaluates the reception environment before the reception process executes, and selects a single satellite search mode or a plural satellite search mode according to the detected reception environment. More particularly, instead of dynamically selecting the search mode based on the reception results while receiving a satellite signal, this aspect of the invention statically selects the search mode before reception begins.

If the reception starts and the search mode is selected dynamically based on the reception conditions, time is required after the reception process starts to evaluate the reception conditions and select the search mode. However, because this aspect of the invention starts reception after selecting the search mode, the satellite signal can be received in a short time after reception starts and power consumption can be reduced.

In addition, because the search mode is selected based on the result returned by the evaluation unit, the effect of the reception environment can be reduced, the probability of successful reception can be improved, the reception time can be shortened, and power consumption can be reduced.

If the reception environment is good and the signal strength (reception level) is greater than or equal to a predetermined threshold level, the time information can be decoded and acquired even if only one positioning information satellite is captured in the single satellite search mode. More specifically, because it is sufficient to capture only one satellite to receive the satellite signal when the single satellite search mode is set, the time and week number information can be acquired in a short time and power consumption can be reduced when the reception environment is good and the signal strength is high. However, if the correct signal cannot be received by capturing one satellite and decoding the received signal in the single satellite search mode, the reception process must be repeated to capture a different satellite and decode the received signal. As a result, when the single satellite search mode is selected, the reception environment deteriorates, and the signal strength drops, the probability of acquiring the time and week number information also drops, the satellite search process and navigation data decoding process repeat, the reception time therefore increases, and power consumption increases.

However, if the reception process runs only in the plural satellite search mode, power consumption increases compared with the single satellite search mode when the reception environment is good. However, when the reception environment is poor and the signal strength is weak, the probability of time and week number information acquisition improves and the reception time is shorter than in the single satellite search mode because the reception unit searches simultaneously for a plurality of satellites and decodes the reception signals, and power consumption can therefore be reduced.

Therefore, by selecting the single satellite search mode or the plural satellite search mode based on the result of the evaluation unit evaluating the reception environment, this aspect of the invention can shorten the average reception time and reduce power consumption, and even when the reception environment deteriorates can increase the probability of being able to acquire the time and week number information, reduce the effect of the reception environment, and improve the probability of successful reception.

The timekeeping device according to another aspect of the invention also has a light measuring unit that measures the amount of light illuminating the timekeeping device. The evaluation unit determines if the amount of light measured by the light measuring unit is greater than or equal to a predetermined threshold level, and the search mode selection unit selects the single satellite search mode if the evaluation unit determines that the measured amount of light is greater than or equal to the predetermined threshold level, and selects the plural satellite search mode if the measured amount of light is less than the predetermined threshold level.

By having a light measuring unit, the timekeeping device according to this aspect of the invention can easily determine if it is outdoors or not. More specifically, when the timekeeping device is illuminated by sunlight, the timekeeping device is exposed to more light than when it is illuminated by indoor lighting. Therefore, by disposing a light sensor, for example, to the timekeeping device and measuring the amount of light illuminating the timekeeping device, whether the timekeeping device is outdoors or not can be easily determined by setting the threshold value used for evaluation to a value enabling determining if the measured amount of light indicates sunlight, that is, that the timekeeping device is outdoors. In addition, because the reception environment for receiving signals from a positioning information satellite is usually better when outdoors than when indoors, this aspect of the invention can easily determine before the reception process starts whether the reception environment is good or not by measuring the amount of light.

This light measuring unit may use a light sensor that directly measures the amount of light, but may also use a solar cell that converts incident light to electrical power. Because the power generated by a solar cell varies according to the amount of light incident to the solar cell, the amount of light can be indirectly measured by detecting how much power is generated by the solar cell. In addition, if the solar cell is also used as the light measuring unit, the number of parts and the cost can be reduced compared with a configuration having a separate light sensor.

The threshold value for measuring the amount of light may set, for example, to a luminance level of 5000 lx (lux). More particularly, the luminance level will always be 5000 lx or greater when outdoors during the day whether it is sunny or cloudy, but the ambient light level when indoors using fluorescent lighting is typically 1000 lx or less. Therefore, if the threshold value is set to approximately 5000 lx, the evaluation unit can determine that the timekeeping device is outdoors if the measured luminance is greater than or equal to the threshold value.

The timekeeping device according to another aspect of the invention also has a speed measuring unit that measures the speed of timekeeping device movement. The evaluation unit determines if the speed of movement measured by the speed measuring unit is less than or equal to a predetermined threshold level, and the search mode selection unit selects the single satellite search mode if the evaluation unit determines that the speed of movement is less than or equal to the predetermined threshold level, and selects the plural satellite search mode if the measured amount of light is greater than the predetermined threshold level.

Because it has a speed measuring unit, this aspect of the invention can determine whether the timekeeping device is stationary or moving. If the timekeeping device is moving, the position of the timekeeping device relative to the positioning information satellite may change and it may not be possible to receive the satellite signal if, for example, a building comes between the timekeeping device and the captured positioning information satellite as the timekeeping device moves. The reception environment is therefore possibly better when the timekeeping device is stationary than when it is moving, and whether the reception environment is good or not can be easily determined before the reception process starts by measuring the speed at which the timekeeping device is moving.

An acceleration sensor, for example, may be used as the speed measuring unit.

The predetermined value (threshold value) of the speed that is evaluated by the evaluation unit may be set to a value that enables determining whether the timekeeping device is stationary or not. For example, if movement is evaluated by measuring acceleration, the user is determined to be walking if the maximum acceleration per unit time when the case oscillates on two perpendicular axes is greater than or equal to a threshold value of 0.98 m/s$^2$ (0.1 G), and the timekeeping device is determined to be stationary if acceleration is less than this threshold value. More specifically, when the timepiece is worn on the wrist and the user is walking or jogging, the maximum acceleration of the case is 4.9-9.8 m/s$^2$ (0.5-1.0 G). The evaluation unit can therefore determine whether the timekeeping device is moving or is stationary based on whether the measured maximum acceleration is greater than or equal to this threshold value.

A timekeeping device according to another aspect of the invention also has a storage unit that stores orbit information for the positioning information satellites. The evaluation unit determines based on the orbit information stored in the storage unit if among the positioning information satellites that can be captured when the reception process is executed there is at least a predetermined number of positioning information satellites located at a high elevation angle greater than or equal to a predetermined angle, and the search mode selection unit selects the single satellite search mode if the evaluation unit determines that there is at least the predetermined number of positioning information satellites located at the high elevation angle, and selects the plural satellite search mode if there is fewer than the predetermined number of satellites.

If orbit information for each of the positioning information satellites is stored in the storage unit, whether there is a positioning information satellite located at a high elevation angle can be determined before reception starts.

When the timekeeping device receives a satellite signal from the positioning information satellite, there is a strong possibility that the positioning information satellite may be obstructed by a building or other structure if the positioning information satellite is at a low elevation angle. Therefore, the reception environment is better when capturing a positioning information satellite near the zenith at a high elevation angle to the timekeeping device than when capturing a positioning information satellite at a low elevation angle.

Whether the reception environment is good or not can therefore be easily determined before reception starts by detecting based on the orbit information if there are a predetermined number of positioning information satellites located at a high elevation angle.

Whether a satellite is at a high elevation angle may be determined by setting a 60° angle of elevation as the high elevation angle, for example.

The timekeeping device according to another aspect of the invention also has a reception level detection unit that detects a reception level of the satellite signal received from a positioning information satellite, and a storage unit that stores the reception level detected by the reception level detection unit. The evaluation unit determines if the reception level stored in the storage unit during the previous reception process is greater than or equal to a predetermined level, and the search mode selection unit selects the single satellite search mode if the evaluation unit determines that the reception level during the previous reception process is greater than or equal to the predetermined level, and selects the plural satellite search mode if the reception level is less than the predetermined level.

This aspect of the invention operates in the single satellite search mode when the previous reception level is greater than or equal to a predetermined level (such as −133 dBm), and operates in the plural satellite search mode when the previous reception level is less than the threshold level.

Whether the reception process is started automatically or manually, the reception environment is generally the same each time reception starts. For example, when the reception process runs at a fixed time every day, the reception environment is usually the same. When the reception process is started manually, the user is typically outside and the reception environment is therefore again often the same.

Therefore, if the previous reception level was high, there is a strong possibility that the reception level will be high and the reception environment is good the next time the reception process runs. If the previous reception level was low, there is a strong possibility that the reception level will be low and the reception environment poor the next time the reception process runs. Whether the reception environment is good or not can therefore be easily determined before the reception process executes based on the previous reception level.

The timekeeping device according to another aspect of the invention also has a reception time measuring unit that measures the reception time from when a satellite signal from a positioning information satellite is received until the time information is acquired, and a storage unit that stores the reception time measured by the reception time measuring unit. The evaluation unit determines if the reception time during the previous reception process stored in the storage unit is less than or equal to a predetermined level, and the search mode selection unit selects the single satellite search mode if the evaluation unit determines that the reception time during the previous reception process is less than or equal to the predetermined level, and selects the plural satellite search mode if the reception level is longer than the predetermined level.

In this aspect of the invention if the previous reception processing time is less than or equal to the predetermined length (such as 3 minutes), operation continues in the single satellite search mode, but operation goes to the plural satellite search mode if the previous reception time is longer than the predetermined length.

Whether the reception process is started automatically or manually, the reception environment is generally the same each time reception starts. If the reception environment is good, the reception time is also short, and the reception time increases as the reception environment deteriorates. Therefore, if the previous reception time was long and the reception environment determined to be not particularly good, the likelihood that the reception environment will not be good the next time the reception process starts is high. Likewise, if the previous reception time was short and the reception environment determined to be good, the likelihood that the reception environment will be good the next time the reception process starts is high. Therefore, whether the reception environment is good or not can be easily determined before the reception process starts based on the previous reception time.

The timekeeping device according to another aspect of the invention also has an external operating member that can be operated by a user. In this aspect of the invention the evaluation unit determines if the external operating member was operated to select the single satellite search mode or the plural satellite search mode, and the search mode selection unit selects the single satellite search mode if the evaluation unit determines that an operation selecting the single satellite search mode was performed, and selects the plural satellite search mode if an operation selecting the plural satellite search mode was performed.

When starting reception, the user can usually determine whether the current location is in an environment where signals from the positioning information satellites can be easily received, such as a location with clear access to the sky, or is an environment where it is difficult to receive signals from a positioning information satellite, such as when buildings or a roof are in the way.

Therefore, if the user manually selects the search mode based on the user's evaluation of the reception environment, there is a strong possibility that the mode matching the reception environment can be selected, the probability is high that the time and week number information can be acquired, the reception time can be shortened, and power consumption can be reduced.

In another aspect of the invention the search mode selection unit selects the single satellite search mode if the evaluation unit determines that neither an operation selecting the single satellite search mode or an operation selecting the plural satellite search mode was performed.

If the user starts the reception process but forgets to select the search mode, this aspect of the invention can run the reception process in the single satellite search mode that is set as the default. This aspect of the invention therefore prevents a drop in usability compared with a configuration in which the reception process does not execute if the search mode is not selected.

In another aspect of the invention the search mode selection unit selects the plural satellite search mode the first time the time reception process is executed after the timekeeping device power turns on regardless of the result output by the evaluation unit.

Because the time of the timepiece is very likely incorrect when the power first turns on, it is necessary to reliably receive the time information. Therefore, if the plural satellite search mode is selected the first time the time information is received after the power is turned on, the possibility of being able to reliably receive the time information improves and the time of the timekeeping device can be set correctly.

Another aspect of the invention is a satellite signal reception method for a timekeeping device having a reception unit that captures a positioning information satellite and receives satellite signals transmitted from the captured positioning information satellite, a time information generating unit that generates time information based on the satellite signal received by the reception unit, a time display unit that displays time information, and a reception control unit that controls the reception unit. The satellite signal reception method includes a satellite capture step for capturing the positioning information satellite; a signal condition detection step for detecting the signal condition of the positioning information satellite captured in the satellite capture step; a decoding step for decoding the satellite signal transmitted from the positioning information satellite captured in the satellite capture step; and a reception channel setting step for setting the reception unit based on the signal condition detected in the signal condition detection step to a single satellite mode in which the number of positioning information satellites that can be simultaneously captured and decoded is 1, or a multi-channel mode in which a plural number of positioning information satellites can be simultaneously captured and decoded.

When a positioning information satellite is captured with this aspect of the invention, the reception channel setting step sets a single satellite mode for capturing a single positioning information satellite or a multi-channel mode for capturing a plurality of positioning information satellites. As a result, a satellite signal can be captured in a short time, power consumption can be reduced, the effect of the reception environment can be reduced, and the probability of successful satellite signal reception can be improved.

As in the timekeeping device described above, this aspect of the invention can therefore shorten the average reception time and reduce power consumption, and even when the reception environment deteriorates can increase the probability of being able to acquire the time and week number information, reduce the effect of the reception environment, and improve the probability of successful reception.

Another aspect of the invention is a satellite signal reception method for a timekeeping device having a reception unit that captures a positioning information satellite and receives satellite signals transmitted from the captured positioning information satellite, a time information generating unit that generates time information based on the satellite signal received by the reception unit, a time display unit that displays time information, and a reception control unit that controls the reception unit. The satellite signal reception method includes an evaluation step that evaluates the reception environment of the timekeeping device before the reception process executes; and a search mode selection step that selects a single satellite search mode or a plural satellite search mode based on the result from the evaluation step when the reception unit runs the reception process. The single satellite search mode is a mode for capturing one positioning information satellite and acquiring time information based on the satellite signal transmitted from the captured positioning information satellite, and the plural satellite search mode is a mode for capturing a plurality of positioning information satellites and acquiring time information based on the satellite signal transmitted from one of the plural captured positioning information satellites.

As with the timekeeping device described above, this aspect of the invention can start reception after selecting the search mode, and can therefore receive a satellite signal in a short time after reception starts and can reduce power consumption. In addition, because the search mode is selected based on evaluating the reception environment, the satellite signal can be received in a short time, power consumption can be reduced, the effect of the reception environment can be reduced, and the probability of successful reception can be improved.

Therefore, as with the timekeeping device described above, this aspect of the invention can shorten the average reception time and reduce power consumption, and even when the reception environment deteriorates can increase the probability of being able to acquire the time and week number information, reduce the effect of the reception environment, and improve the probability of successful reception.

DESCRIPTION OF THE PREFERRED EMBODIMENTS

Preferred embodiments of the present invention are described below with reference to the accompanying figures.

The embodiments described below are specific preferred embodiments of the present invention and certain technically preferred limitations are therefore also described, but the scope of the present invention is not limited to these embodiments or limitations unless specifically stated below.

Embodiment 1

Figure 1:
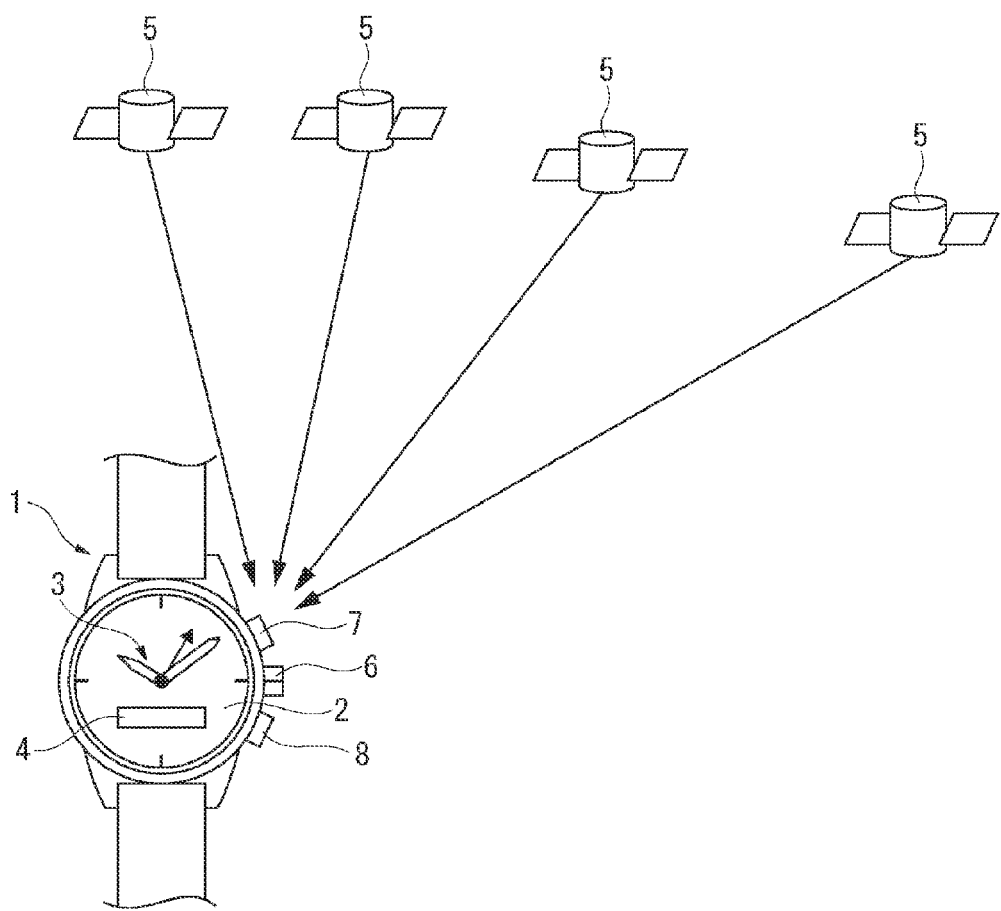
FIG. 1 is a schematic diagram showing a GPS wristwatch according to the present invention.
Figure 2:
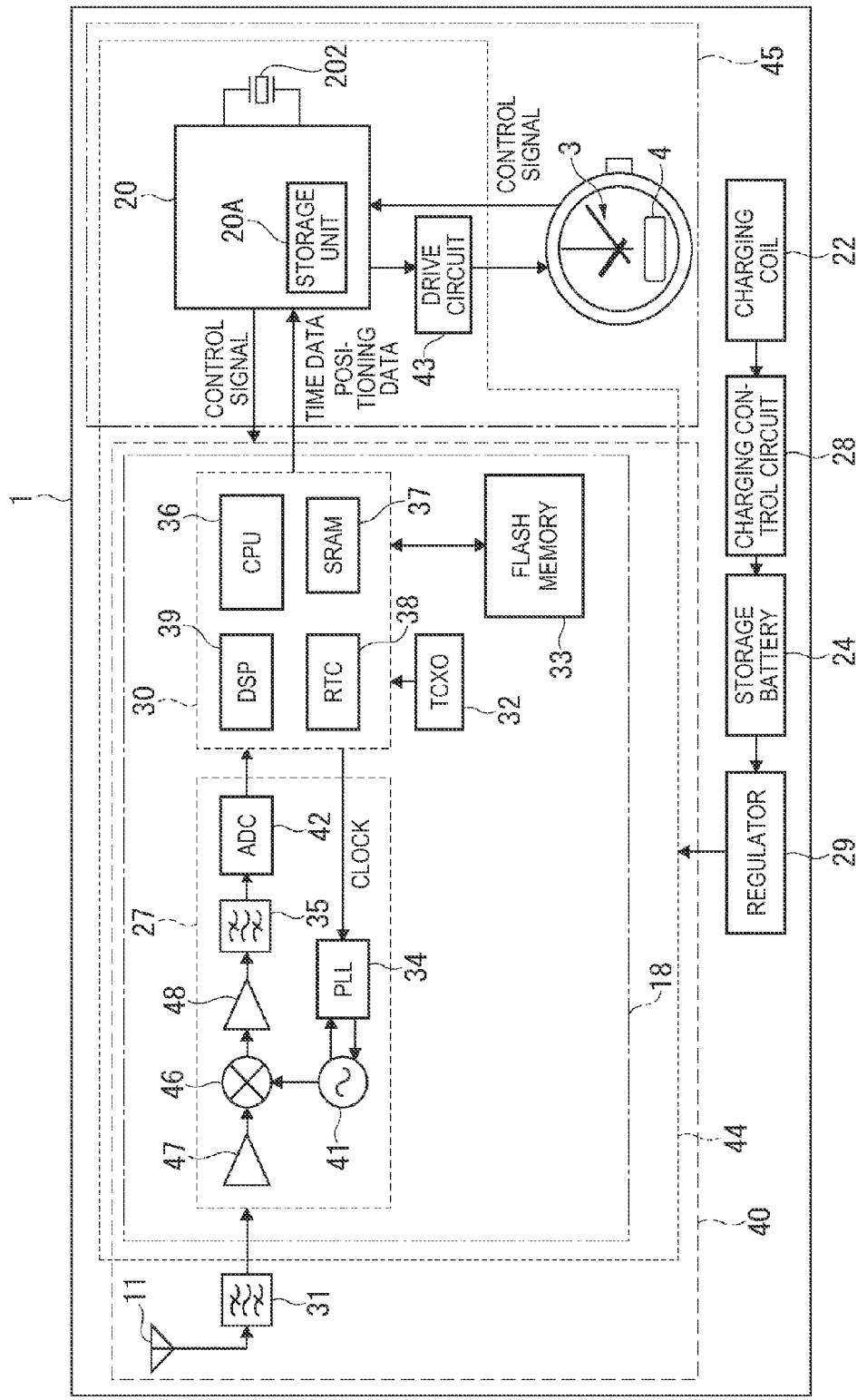
FIG. 2 is a block diagram showing the circuit design of the GPS wristwatch shown in FIG. 1.

FIG. 1 is a schematic diagram showing a wristwatch with a GPS satellite signal reception device 1 (referred to below as a GPS wristwatch 1) as an example of a timekeeping device according to the present invention. FIG. 2 shows the main hardware configuration of the GPS wristwatch 1.

As shown in FIG. 1, the GPS wristwatch 1 has a time display unit including a dial 2 and hands 3. A window is formed in a part of the dial 2, and a display 4 such as an LCD panel is located in this window.

The hands 3 include a second hand, minute hand, and hour hand, and are driven through a wheel train by means of a stepping motor.

The display 4 is typically a LCD unit and is used for displaying the latitude and longitude, city name, or other location information, as well as messages.

The GPS wristwatch 1 receives satellite signals from a plurality of GPS satellites 5 orbiting the Earth on fixed orbits in space, acquires satellite time information, and can adjust the internally kept time based on the satellite time information and display the positioning information, that is, the current position, on the display 4.

The GPS satellite 5 is an example of a positioning information satellite used in the invention, and a plurality of GPS satellites 5 are orbiting the Earth in space. At present there are approximately 30 GPS satellites 5 in orbit.

The GPS wristwatch 1 has a crown 6 and buttons 7 and 8 as external operating members.

Circuit Design of the GPS Wristwatch

The circuit design of the GPS wristwatch 1 is described next.

As shown in FIG. 2, the GPS wristwatch 1 also has a time display device 45, a GPS device 40, and a time adjustment device 44, and functions as a computer. As shown in FIG. 2, the time display device 45, the GPS device 40, and the time adjustment device 44 share some parts.

The configurations shown in FIG. 2 are further described below.

GPS Device

As shown in FIG. 2, the GPS wristwatch 1 has a GPS device 40 that receives and processes satellite signals received from a GPS satellite 5.

The GPS device 40 includes the GPS antenna 11, a filter (SAW) 31, and the reception circuit 18. The filter (SAW) 31 is a bandpass filter and in this embodiment of the invention extracts a 1.5-GHz satellite signal. The GPS device 40 thus renders the reception unit of the present invention.

The reception circuit 18 processes the satellite signal extracted by the filter, and includes an RF (radio frequency) unit 27 and baseband unit 30.

The RF unit 27 includes a PLL 34, IF filter 35, VCO (voltage controlled oscillator) 41, A/D converter 42, mixer 46, low noise amplifier 47, and IF amplifier 48.

The satellite signal is extracted by the filter 31 and amplified by the low noise amplifier 47, mixed by the mixer 46 with the signal from the VCO 41, and down-converted to an IF (intermediate frequency) signal.

The IF signal mixed by the mixer 46 passes the IF amplifier 48 and IF filter 35, and is converted to a digital signal by the A/D converter 42.

The baseband unit 30 also includes a digital signal processor (DSP) 39, a CPU (central processing unit) 36, SRAM (static random access memory) 37, and a real-time clock (RTC) 38. A temperature-compensated crystal oscillator (TCXO) 32 and flash memory 33 are also connected to the baseband unit 30.

The baseband unit 30 then processes the digital signal input from the A/D converter 42 of the RF unit 27 based on a control signal, and processes (decodes) the satellite signal to acquire the satellite time information and positioning information.

The clock signal of the PLL 34 is generated by the TCXO 32.

The real-time clock 38 counts up at the reference clock output from the TCXO 32.

Time Adjustment Device

The time adjustment device 44 includes the reception circuit 18, the control unit 20, a drive circuit 43, and a crystal oscillator 202. This time adjustment device 44 renders the time information correction unit of the invention.

The control unit 20 includes a storage unit 20A and controls driving the GPS device 40, the hands 3, and the display 4. More specifically, the control unit 20 renders a reception control unit that sends control signals to the reception circuit 18 and controls the reception operation of the GPS device 40.

The storage unit 20A stores the time data (satellite time information) and positioning data acquired by the baseband unit 30 of the reception circuit 18, and the internal time data.

An oscillation circuit not shown connected to the crystal oscillator 202 is also disposed to the control unit 20. The crystal oscillator 202 and oscillation circuit produce a reference signal, and the internal time data stored in the storage unit 20A is updated according to this reference signal. The control unit 20 and crystal oscillator 202 thus render an internal time data generating unit that keeps the internal time.

Time Display Device

The time display device 45 includes the control unit 20, the storage unit 20A, the drive circuit 43, the crystal oscillator 202, the hands 3, and the display 4.

The drive circuit 43 includes a hand drive circuit that drives a stepping motor not shown to drive the hands 3, and a display drive circuit that drives the display 4.

The internal time data generated by the crystal oscillator 202 and oscillation circuit is stored as the current time in the storage unit 20A, and the control unit 20 controls displaying the time by the hands 3 and display 4 based on the time data stored in the storage unit 20A.

The control unit 20 calculates the Coordinated Universal Time (UTC) by adding the UTC offset (currently +14 seconds) to the satellite time information acquired by the baseband unit 30. The control unit 20 also calculates the current local time used by the GPS wristwatch 1 by adding the time difference to the UTC stored in the storage unit 20A, and stores the current local time in the storage unit 20A. The control unit 20 thus functions as a time information generating unit that generates time information based on the received satellite signal.

When the time information generated from the received satellite signal is stored in the storage unit 20A and the internal time data is updated, the control unit 20 displays the corrected time information on the display 4 by means of the drive circuit 43.

The control unit 20 also calculates the difference between the current time indicated by the hands 3 and the corrected internal time data, drives the stepping motor by means of the drive circuit 43 to move the hands 3 an amount equal to this time difference, and thus controls the hands 3 to display the corrected time.

The GPS wristwatch 1 according to this embodiment of the invention is driven by power supplied from a rechargeable storage battery 24.

More specifically, a charging coil 22 charges the storage battery 24 with power through the charging control circuit 28. The storage battery 24 supplies drive power to the time adjustment device 44 and other parts through a regulator 29.

The timekeeping mechanism according to this embodiment of the invention described above is thus an electronic timepiece.

Description of the Navigation Message

The navigation message that is the signal (satellite signal) transmitted from each GPS satellite 5 is described next.

Figure 3:
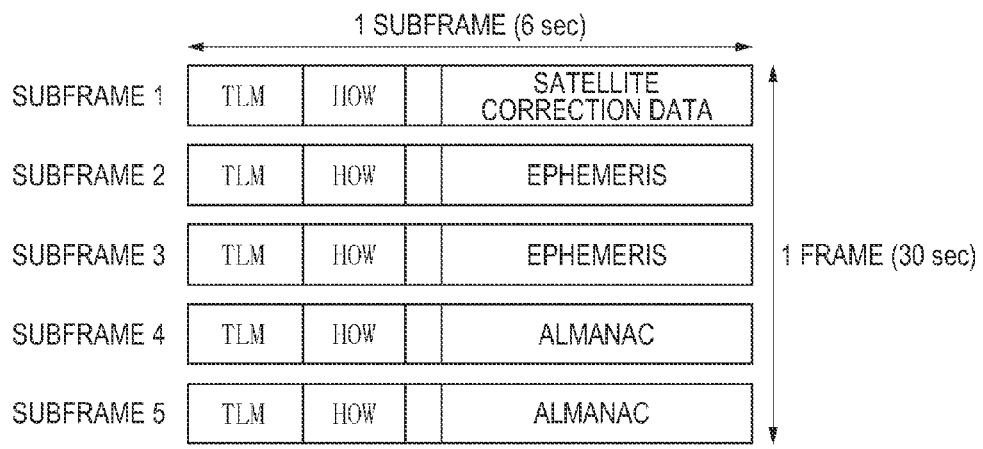
FIG. 3 schematically describes the structure of a GPS satellite signal.
Figure 4:
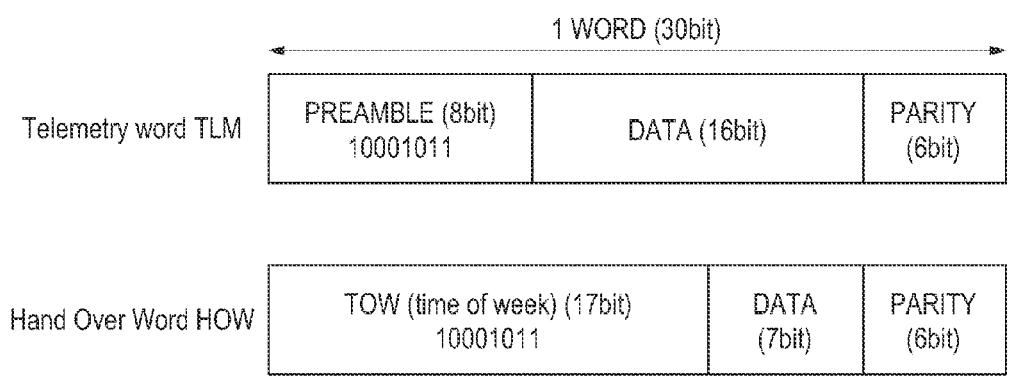
FIG. 4 describes the GPS satellite signal.

FIG. 3 and FIG. 4 schematically describe the GPS signal.

Figure 6:
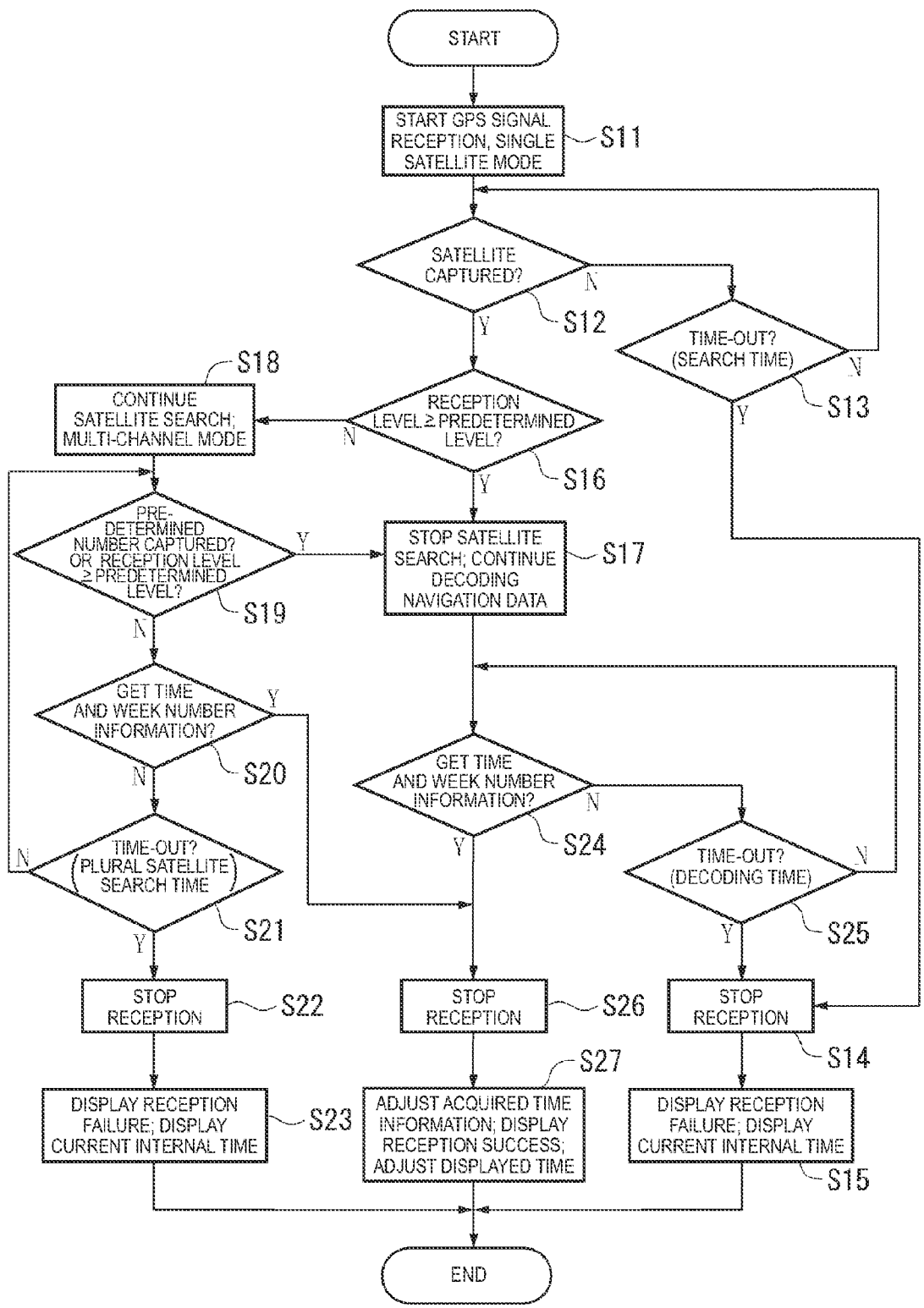
FIG. 6 is a flow chart of the reception process in the first embodiment of the invention.

As shown in FIG. 6, signals are transmitted from each of the GPS satellites 5 in units of one frame every 30 seconds. One frame contains five subframes. Each subframe is 6 seconds long, and contains 10 words (each word is 0.6 second).

The first word in each subframe is a telemetry (TLM) word storing the TLM data, and each TLM word starts with a preamble as shown in FIG. 4.

The TLM word is followed by a handover word HOW storing the HOW (handover) data, and each HOW starts with the time of week (TOW) (also called the Z count) indicating the GPS time information of the GPS satellite.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. This GPS time is also called the Z count or the Z count data, and enables the GPS wristwatch 1 to know the current time.

The word data in subframe 1 shown in FIG. 3 contains words storing satellite correction data such as week number data (WN) and the satellite health information (SVhealth)

The same GPS week number identifies the week in which the current GPS time information is expressed.

More specifically, the starting point for the GPS time information is 00:00:00 of Jan. 6, 1980 referenced to the Coordinated Universal Time (UTC), and the week that started on this day is week 0. The GPS receiver can therefore get the precise GPS time from the week number and the elapsed time (number of seconds).

The week number is updated once a week.

Once the receiver gets the week number and counts the seconds passed since the week number was acquired, the current week number of the GPS satellite 5 can be known from the acquired week number and the elapsed time without getting the week number data again. As a result, the approximate current GPS time can be known once the Z count data is acquired. As a result, the GPS device 40 normally acquires only the Z count data when getting the time information.

The main frame of the navigation message contained in the signal from the GPS satellite 5 contains 1500 bits and is transmitted at 50 bps.

The main frame is divided into five subframes of 300 bits each.

One frame is equivalent to 30 seconds. One subframe is therefore equivalent to 6 seconds. As described above, the TLM word and the Z count data (TOW) in the HOW word are contained in the first two words of each subframe. The Z count data starts from subframe 1, and six seconds of data is contained in each subframe. Subframe 1 to subframe 5 therefore contain the TLM word and the Z count (TOW) data in the HOW word. The Z count (TOW) data is therefore the time information for the next subframe. For example, the Z count data in subframe 1 is the time data for subframe 2.

As shown in FIG. 3 and FIG. 4, the navigation message carried in the satellite signal from the GPS satellite 5 includes the preamble data and the TOW in the HOW word, and subframe data, including satellite correction data such as the week number and satellite health data, the ephemeris (detailed orbit information for the transmitting GPS satellite 5), almanac (orbit information for all GPS satellites 5), and the UTC data. More specifically, the subframe data of the navigation message is carried in subframe 1 to subframe 5, and the data in these five subframes render one frame data unit. The subframe data is divided into words 1 to 10.

The HOW data or Z count data is therefore transmitted at 6-second intervals, and week number (WN), the ephemeris parameters and the almanac parameters are transmitted at 30-second intervals.

Because the signals described above are transmitted from the GPS satellites 5, satellite signal reception as used herein means phase synchronization with the C/A code in the satellite signal transmitted from each GPS satellite 5.

More specifically, the baseband unit 30 must synchronize with the signal from the GPS satellite 5 in order to get the frame data from a particular GPS satellite 5.

The C/A code is used for synchronization with 1 ms precision, and is a 1023-chip pseudo random noise code that repeats every 1 ms. The C/A code (1023 chip (1 ms) code) is different for each of the plural GPS satellites 5, and is unique to a particular satellite.

Therefore, to receive the satellite signal from a particular GPS satellite 5, the GPS device 40 generates the unique C/A code for a particular GPS satellite 5 and phase synchronizes with the C/A code from the selected GPS satellite 5 to receive the satellite signal.

By synchronizing with the C/A code (1023 chips (1 ms)), the preamble of the TLM word and the HOW word of each subframe can be received, and the Z count data (time information) can be acquired from the HOW word.

The positioning information can be acquired by reading the ephemeris parameters in the satellite signals from three to four satellites. The ephemeris data can be acquired by receiving 600 bits or approximately 12 seconds from the preamble of subframe 2, which is transmitted every 30 seconds.

The navigation message that is the satellite signal from the GPS satellites 5 is configured as described above.

Figure 5:
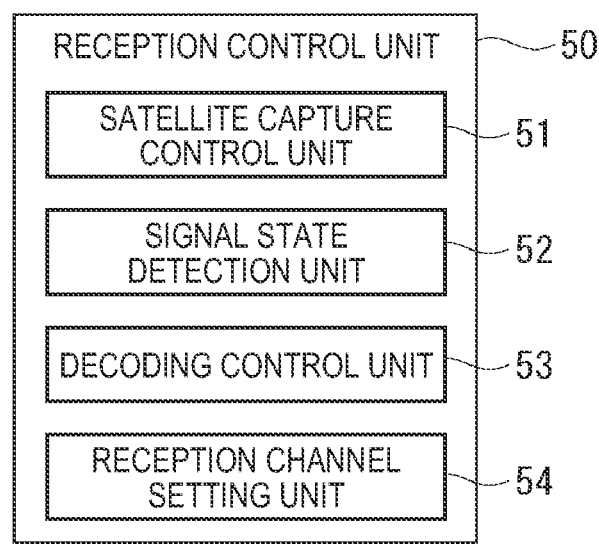
FIG. 5 is a block diagram showing the configuration of the reception control unit in the first embodiment of the invention.

The system configuration of the reception control unit 50 according to the invention is described next with reference to FIG. 5. FIG. 5 shows the function blocks rendered by primarily the control unit 20 executing a program.

More specifically, the reception control unit 50 includes a satellite capture control unit 51, a signal state detection unit 52, a decoding control unit 53, and a reception channel setting unit 54.

Time Information Reception Process

The reception operation of the GPS wristwatch 1 according to this embodiment of the invention is described next with reference to the flow chart in FIG. 6.

The time information reception process shown in FIG. 6 is executed when initiated manually by the user and when a preset reception time arrives. This preset reception time is, for example, 2:00 or 3:00 a.m. or 7:00 or 8:00 a.m.

Setting the reception time to 2:00 or 3:00 a.m. is effective because the likelihood is high that the GPS wristwatch 1 has been taken off by the user and has been left stationary indoors on a table beside the window, for example, electrical appliance use is minimal and there is little noise, and the signal reception environment is good.

Setting the reception time to 7:00 or 8:00 a.m. is also effective because this is the typical time for commuting to work or school, and the likelihood is high that the user wearing the GPS wristwatch 1 will be outdoors sometime during this period. The invention is not limited to these times, however, and the automatic reception time could be set by the user.

When the time information reception process starts, the satellite capture control unit 51 of the reception control unit 50 sets the reception mode of the GPS device 40, that is, the reception unit, to a single satellite mode (1-channel mode) limiting the number of captured GPS satellites 5 to one, and then starts receiving the satellite signal transmitted from the GPS satellite 5 (S11). More specifically, the satellite capture control unit 51 controls the GPS device 40 to generate the C/A code pattern of the GPS satellite 5 as described below and start reception in order to receive the GPS signal, that is, the satellite signal, from the GPS antenna 11. The baseband unit 30 then determines the correlation between the C/A code and the received satellite signal to find a GPS satellite 5 with which reception can be synchronized.

The satellite capture control unit 51 then determines if the GPS satellite 5 was captured or not (S12). If in step S12 it is determined that the satellite could not be captured, the satellite capture control unit 51 determines if the satellite capture time (search time) is greater than or equal to a preset time (search timeout determination time), that is, if the search timed out (S13).

The satellite capture control unit 51 determines if operation timed out as described below.

It takes several hundred milliseconds to complete the capture process for one satellite. If the GPS wristwatch 1 has not previously run the satellite capture process and acquired orbit information (almanac data) for all of the satellites, that is, if the GPS wristwatch 1 is operating from a cold start, the GPS wristwatch 1 searches for any GPS satellite 5 it can find. Even if searching starts from GPS satellite 5 No. 1 and a satellite is not captured until GPS satellite 5 No. 30, that is, capturing a satellite takes the longest time, a satellite can be captured in approximately 2 seconds. Therefore, if a satellite cannot be captured by the time the predetermined search timeout time has passed (such as 3 seconds) after reception starts, the satellite capture control unit 51 determines that operation timed out in step S13.

If operation has timed out in step S13, the satellite capture control unit 51 stops the GPS reception process in the GPS device 40 (S14). The satellite capture control unit 51 then indicates on the display 4, for example, that reception failed, and the control unit 20 moves the hands 3 based on the currently stored internal time to display the internal time (S15).

If it was determined that a satellite was captured in step S12, the signal state detection unit 52 determines if the reception level (signal strength) of the captured GPS satellite 5 is greater than or equal to a predetermined value (such as −137 dBm) (S16).

If the reception level is greater than or equal to the predetermined threshold level in step S16, the satellite capture control unit 51 ends the satellite search process by the GPS device 40, and the decoding control unit 53 continues with the process decoding the navigation data received from the captured GPS satellite 5 in the single satellite mode (S17).

If in step S16 the reception level is less than the predetermined level, the reception channel setting unit 54 sets the reception mode to the multi-channel mode for capturing a plurality of GPS satellites 5 in parallel, and the satellite capture control unit 51 continues the satellite search process in the multi-channel mode (S18). In this embodiment of the invention the reception channel setting unit 54 sets an 8-channel mode in which navigation data can be received simultaneously from eight different GPS satellites 5.

The satellite capture control unit 51 and signal state detection unit 52 then determine if the reception level of the GPS satellite 5 captured next is greater than or equal to a predetermined level, or if a predetermined number (such as 3) GPS satellites 5 have been captured even though the reception level is less than the predetermined level (S19).

If S19 returns Yes, that is, the reception level of the captured GPS satellite 5 is greater than or equal to the predetermined level or if a predetermined number (such as 4 to 8) GPS satellites 5 with a reception level less than the predetermined threshold level were captured, the satellite capture control unit 51 ends the satellite search process and the decoding control unit 53 continues with the process decoding the navigation data received from the captured GPS satellite or satellites 5 in the multi-channel mode (S17).

If step S19 returns No because a satellite could not be captured, or because a satellite was captured but the reception level is less than the predetermined threshold level and the number of captured satellites is less than the predetermined number (such as 3), the decoding control unit 53 determines if the time information could be decoded from the signal received from the captured GPS satellite 5 (S20).

More specifically, when the multi-channel mode is set, a plurality of GPS satellites 5 can be captured and the navigation data decoding process can be applied in parallel to each of the received signals. Therefore, while the satellite search process continues, the navigation data can be decoded from the captured satellite signal on the channel on which a GPS satellite 5 was already captured, and the time information and week number may be acquired from the navigation data received from one of the GPS satellites 5 before the predetermined number of GPS satellites 5 is captured. The decoding control unit 53 therefore confirms in step S20 if the time and week number information were received while the satellite search process continues.

If step S20 returns No, the satellite capture control unit 51 determines if a predetermined time (multi-search timeout determination time) has passed (S21). If the satellite search process is set to the multi-channel mode, step S21 sets the multi-search time-out determination time based on the time required to search for all of the GPS satellites 5. The multi-search time-out determination time of the multi-channel mode used in step S21 may therefore be set to the same time as the search time-out determination time of the single satellite mode in S13, or it may be set to a shorter time if the search is completed in a shorter time in the multi-channel mode.

If step S21 returns No, control returns to step S19 and the satellite capture control unit 51 continues the satellite search process and determines if a satellite can be captured.

If step S21 determines that operation timed out, the satellite capture control unit 51 stops the GPS reception process (S22) and indicates on the display 4, for example, that reception failed, and the control unit 20 moves the hands 3 based on the currently stored internal time and displays the internal time.

In step S24 the decoding control unit 53 determines if the time and week number values could be acquired after decoding the navigation data in step S17.

In steps S20 and S24 the decoding control unit 53 normally determines if the Z count data and week number (WN) data could be acquired, that is, if the time and week number could be acquired. However, if it is not necessary to acquire the week number (WN) data because less than one week has passed since the last time the week number (WN) data was acquired, whether the Z count data was acquired may be determined in S20 and S24.

If it is determined in step S24 that the time and week number could not be acquired, the decoding control unit 53 determines if the navigation data decoding time has reached the time-out limit (S25). More specifically, the decoding control unit 53 determines that the reception condition is poor if the time and week number cannot be acquired by the time the predetermined time (decoding time-out determination time) passes after the start of the navigation data decoding process.

This decoding time-out determination time may be set to approximately 12 to 24 seconds if only the Z count, which is transmitted every 6 seconds, is acquired. If the time information is acquired through the week number, which is transmitted every 30 seconds, the decoding time-out determination time may be set to approximately 60 to 120 seconds.

If operation has not timed out in S25, the decoding control unit 53 continues determining if the time and week number have been acquired (S24).

If operation has timed out in S25, the decoding control unit 53 stops the GPS reception process (S14) and indicates on the display 4, for example, that reception failed, and the control unit 20 moves the hands 3 based on the currently stored internal time to display the internal time (S15).

If it is determined in S24 that the time and week number information were acquired, the decoding control unit 53 stops the GPS reception process (S26) and indicates on the display 4, for example, that reception succeeded, and the control unit 20 moves the hands 3 based on the acquired time information to correct the time displayed by the hands 3 (S27).

This embodiment of the invention starts the satellite capture process (satellite search process) in the single satellite mode, and continues in the single satellite mode to decode the navigation data sent from the single captured GPS satellite 5 if the reception level is greater than or equal to a predetermined level.

If the reception level is less than this predetermined level, however, operation switches to the multi-channel mode, and if the predetermined number of satellites are captured or if a satellite with a reception level greater than or equal to the predetermined level is captured, the navigation data transmitted from the captured GPS satellite 5 is decoded.

Test Data

Figure 7:
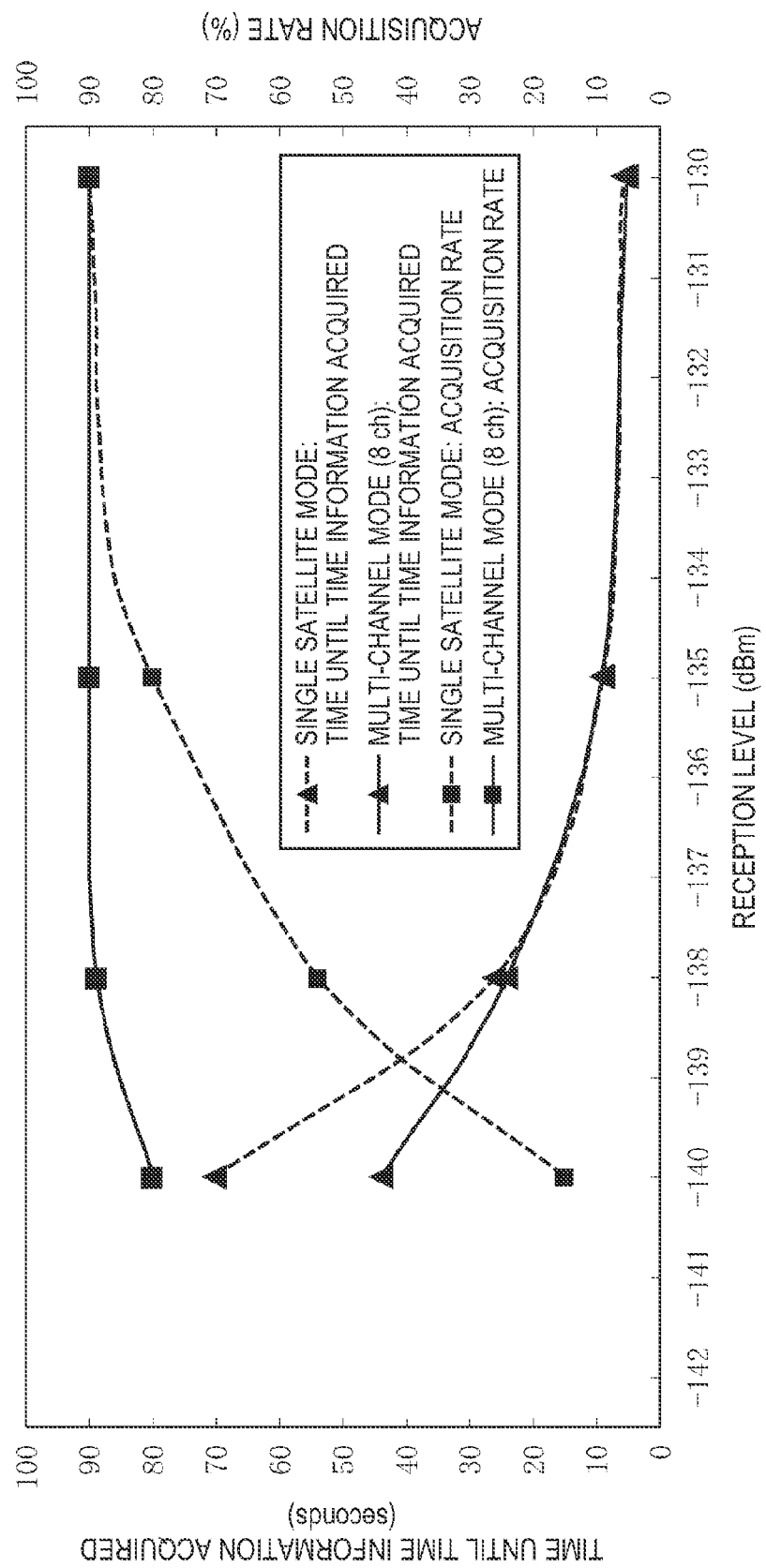
FIG. 7 is a graph showing the relationship between satellite signal strength, signal acquisition rate, and signal acquisition time.

FIG. 7 is a graph of test data showing the relationship between the acquisition rate and the time required to acquire the time information (Z count data and week number (WN) data) in the single satellite mode and the multi-channel mode.

As shown in FIG. 7 the Z count data acquisition time decreases as the reception level increases, and is less than approximately 10-20 seconds in both modes if the reception level is greater than or equal to −137 dBm.

However, the Z count data acquisition time increases as the reception level decreases, and if the reception level is less than or equal to −139 dBm, approximately 40-70 seconds is required in both modes and step S23 therefore returns a time out.

That the Z count data acquisition time becomes shorter as the reception level rises is true in both modes. However, the acquisition rate exceeds 80% in the single satellite mode (1-channel mode) when the reception level is −135 dBm or greater, and the acquisition rate drops proportionally to the reception level when the reception level goes to −135 dBm or less. In the multi-channel mode, however, the acquisition rate goes to 80% or more when the reception level is −140 dBm or greater, and a high acquisition rate can be sustained at a lower reception level.

If current consumption in the reception process is a value of 1 in the single satellite mode, current consumption goes to approximately 1.5 to 3.0 in the multi-channel mode. Note that this current consumption is approximately 1.5 in reception environments where there is clear access to the sky overhead, and is approximately 3.0 when the reception environment is poor, such as when indoors.

EFFECT OF THE INVENTION

The effect of this embodiment of the invention is described next.

(1) The GPS wristwatch 1 starts the satellite search process in the single satellite mode and decodes the navigation data in the single satellite mode if the reception level (signal strength) is greater than or equal to a predetermined threshold level. If the reception level is less than the predetermined threshold level, operation switches to the multi-channel mode to decode the navigation data, thereby reducing the effect of the reception environment, improving the probability of being able to acquire the time and week number information, and reducing power consumption.

More specifically, if the reception process operates only in the single satellite mode, the time and week number information can be acquired in a short time and power consumption can be reduced if the reception environment is good and the reception level is high. However, if the reception environment deteriorates and the reception level drops, the time and week information acquisition rate also drops, the satellite search process and navigation data decoding process must be repeated, and the reception time therefore becomes longer and power consumption rises.

However, if the reception process operates only in the multi-channel mode, the time and week number acquisition rate can be increased even if the reception environment deteriorates and the reception level is low. The reception time can therefore be shortened and power consumption can be reduced compared with the single satellite mode. However, when the reception environment is good, power consumption is greater than in the single satellite mode.

By using a reception channel setting unit 54 to select the single satellite mode or multi-channel mode based on the reception level, this aspect of the invention can shorten the average reception time, reduce power consumption, and increase the probability of acquiring the time and week number even in a poor reception environment. This aspect of the invention can thus reduce the limitations on where the satellite signal is received and improve user convenience.

(2) When searching for satellites in the multi-channel mode, whether the time and week number information was acquired is determined in step S20 even if the conditions in step S19 are not true (step S19 returns No). As a result, if the time and week number were acquired in step S20, the GPS reception process can be stopped (S26), the average time and week number acquisition time can be shortened in the multi-channel mode, and power consumption can also be reduced.

(3) Because the GPS wristwatch 1 according to this embodiment of the invention is used worn by the user, the reception environment can change easily compared with timepieces such as clocks that are used at a stationary location inside a building, particularly in the city with tall buildings that can easily block signals from the GPS satellites 5 and when the user is walking where receiving signals from a GPS satellite 5 can be difficult.

However, because the GPS wristwatch 1 according to this embodiment of the invention switches from the single satellite mode to the multi-channel mode when the reception environment deteriorates, the time and week number can be acquired in a short time and power consumption can be reduced. The GPS wristwatch 1 according to this embodiment of the invention is thus particularly suited to a portable timepiece such as a wristwatch or a pocket watch.

Embodiment 2

A second embodiment of the invention is described next. Note that in each of the embodiments described below parts that are the same or similar to like parts in another embodiment are identified by the same reference numerals, and further description thereof is omitted or simplified.

Figure 8:
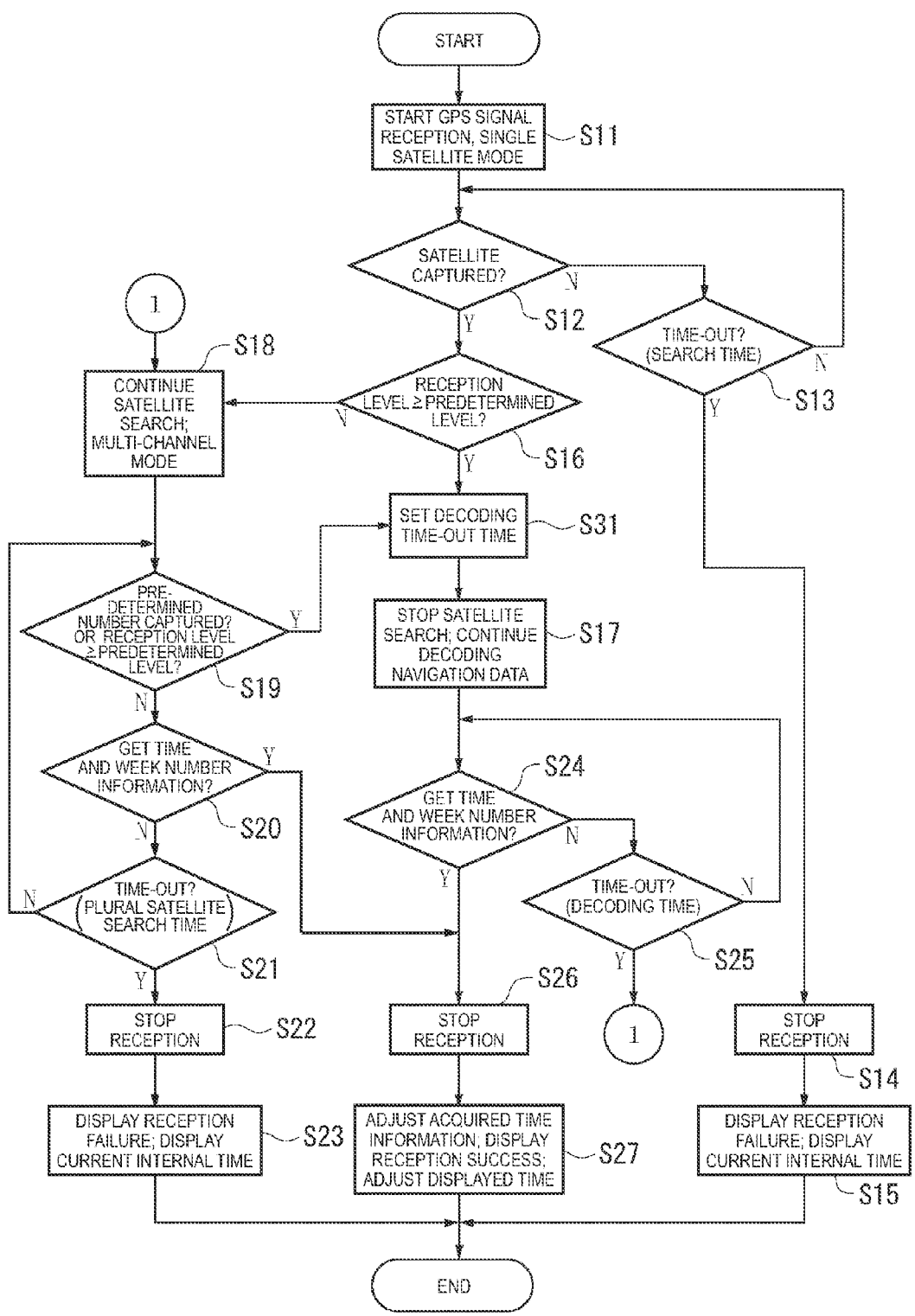
FIG. 8 is a flow chart of the reception process in the second embodiment of the invention.

As shown in the flow chart in FIG. 8, the second embodiment differs from the first embodiment in that the time-out determination time of the decoding process is set according to the reception level, and if the decoding process times out in the single satellite mode, the reception channel setting unit 54 changes to the multi-channel mode without stopping GPS signal reception. Other aspects of the processing method and circuit configuration of this embodiment are the same as in the first embodiment.

The operation of this second embodiment is described below with reference to the flow chart in FIG. 2, focusing on the differences between this and the first embodiment described above.

Steps S11 to S27 in FIG. 8 are the same as in the first embodiment, and further description thereof is thus omitted.

However, if the reception level is greater than or equal to the predetermined threshold level in step S16 in the first embodiment, the satellite search is aborted and the navigation data decoding process continues in step S17.

In this second embodiment, however, the time used to determine if the decoding process times out (the decoding time-out determination time) is set in step S31 before proceeding to step S17.

The decoding time-out determination time is set according to the reception level in step S31. For example, step S16 is set to return Yes if the reception is greater than or equal to −137 dBm.

In this example the decoding time-out determination time when only the Z count data is acquired is set in S31 to 24 seconds if the reception level is greater than or equal to −137 dBm or is less than or equal to −133 dBm, and is set to 12 seconds if the reception level is greater than −133 dBm.

If information through the week number is acquired, the decoding time-out determination time is set to 120 seconds if the reception level is greater than or equal to −137 dBm or is less than or equal to −133 dBm, and is set to 60 seconds if the reception level is greater than −133 dBm.

The decoding control unit 53 then uses the decoding time-out determination time set in step S31 for determining in S25 if decoding timed out. If decoding time out in S25, the reception channel setting unit 54 switches to the multi-channel mode and continues the satellite search process (S18).

If a plurality of GPS satellites 5 have been captured in S19, a decoding time-out determination time may be set in step S31 for each individual channel, that is, for each GPS satellite 5. This enables appropriately detecting if decoding timed out based on the signal strength of each GPS satellite 5.

Furthermore, if the time and week number was successfully acquired from at least one of the plural captured GPS satellites 5, step S24 returns Yes. This is because the time of the GPS wristwatch 1 can be corrected if the time and week number are acquired from at least one satellite.

Effect of the Second Embodiment

The second embodiment of the invention also achieves the effects (1) to (3) of the first embodiment described above.

(4) In addition, by setting the decoding time-out determination time according to the reception level in S31, whether the time and week number information can be received can be determined more accurately and quickly. More specifically, when the reception level is high, the time and week number information can be received in a short time as shown in FIG. 7, and the decoding time-out determination time can therefore also be set in a short time. If decoding times out, it can be quickly determined that the time and week number information cannot be received from the captured GPS satellite 5. The time spent on needless reception processes can therefore be shortened, and power consumption can be further reduced.

(5) Furthermore, because the multi-channel mode is entered in S18 and processing continues instead of stopping reception as in the first embodiment when a time-out is detected in S25, the probability of being able to receive the time and week number information can be improved and the usability of the GPS wristwatch 1 can be improved.

More specifically, the signal reception level may be high when the reception level is evaluated in step S16 when the GPS wristwatch 1 is worn by a user walking around outdoors, but it may not be possible to acquire the time and week number information when the navigation data is decoded because the signal strength may have dropped as a result of the signal from the GPS satellite 5 being blocked by a building as the user continues moving. This second embodiment of the invention avoids this problem by entering the multi-channel mode in such situations to search for a plurality of GPS satellites 5 and decode the navigation data, thereby improving the possibility that the time and week number information can be acquired, improving the probability that the internal time can be corrected to the correct time, and improving user convenience.

Embodiment 3

A third embodiment of the invention is described next.

Figure 9:
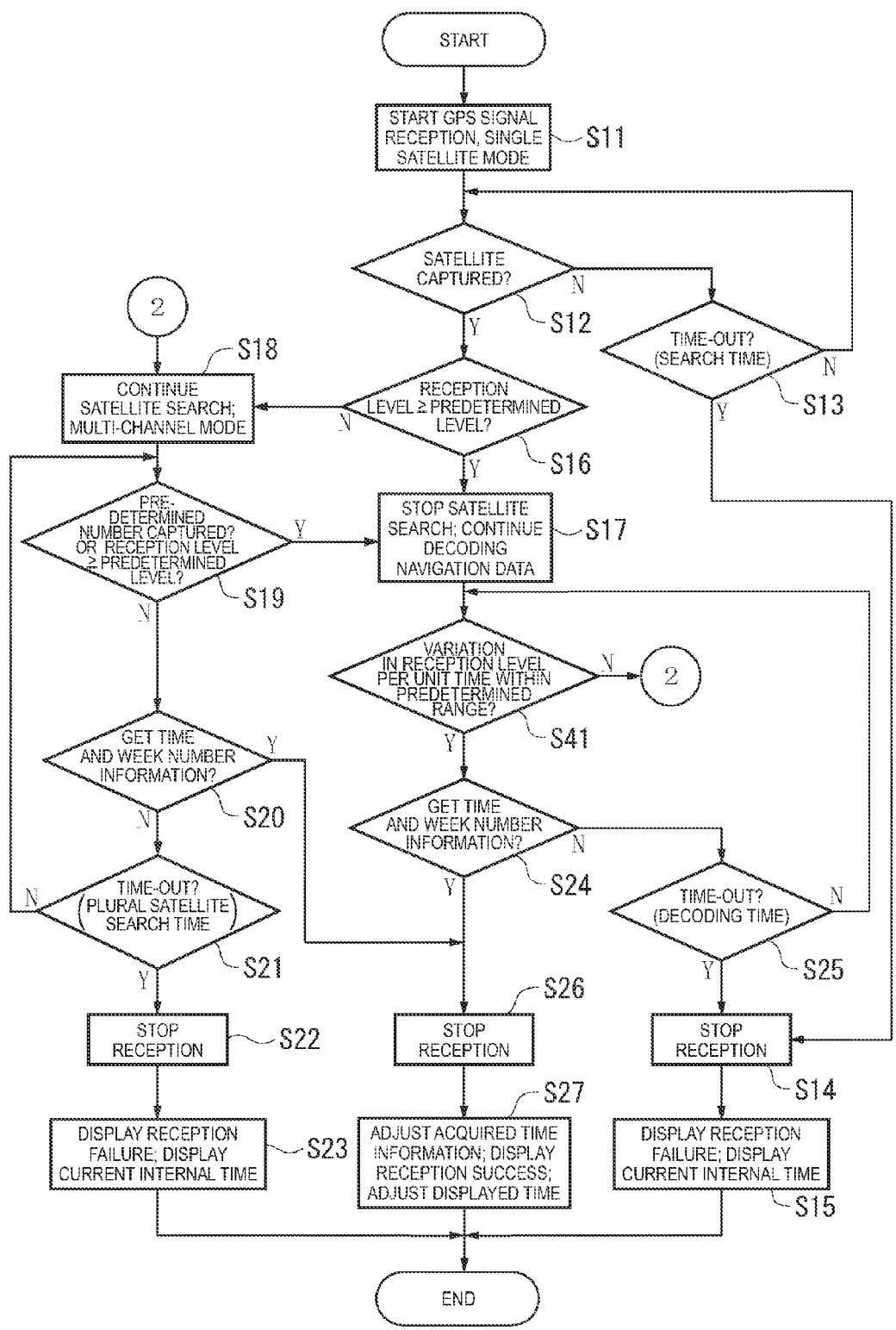
FIG. 9 is a flow chart of the reception process in the third embodiment of the invention.

As shown in the flow chart in FIG. 9, the third embodiment of the invention differs from the first embodiment in that it determines if the range of variation in the reception level per unit time is within a predetermined range (S41) and goes to the multi-channel mode if this predetermined range is exceeded. Other aspects of the operation and configuration of this embodiment are the same as in the first embodiment.

The operation of this third embodiment is described next with reference to the flow chart in FIG. 9, focusing on the differences between this embodiment and the first embodiment.

Steps S11 to S27 in FIG. 9 are the same as in the first embodiment, and further description thereof is thus omitted.

In this third embodiment of the invention, the signal state detection unit 52 determines if the range of variation in the reception level per unit time is within a predetermined range (S41). In step S41 the signal state detection unit 52 determines, for example, if the variation in the reception level per second is ±3 dBm.

If variation in the reception level is greater than or equal to the predetermined range in S41, the reception channel setting unit 54 switches to the multi-channel mode and processing proceeds (S18).

If a plurality of GPS satellites 5 have been captured in step S19, step S41 returns No only if the variation in the reception level was greater than the predetermined range for all of the captured GPS satellites 5, and returns Yes if the variation in the reception level was within the predetermined range for at least one of the satellites. Because the possibility of being able to acquire the time and week number information is high if there is at least one GPS satellite 5 with little variation in the reception level, the time and week number information can be acquired in less time than if the satellite search process is repeated in step S18, and power consumption can be further reduced accordingly.

Effect of the Third Embodiment

The third embodiment of the invention also achieves the effects (1) to (3) of the first embodiment described above.

(6) In addition, because the range of variation in the reception level per unit time is determined in step S41, it can be determined that acquiring the time and week number information is difficult without waiting for decoding to time out when the captured GPS satellite 5 becomes hidden by a building and the strength of the reception signal drops. Because operation switches to the multi-channel mode in step S18 if step S41 returns No, the probability of being able to receive the time and week number information can be improved and the convenience of the GPS wristwatch 1 can also be improved.

Embodiment 4

A fourth embodiment of the invention is described next.

Figure 10:
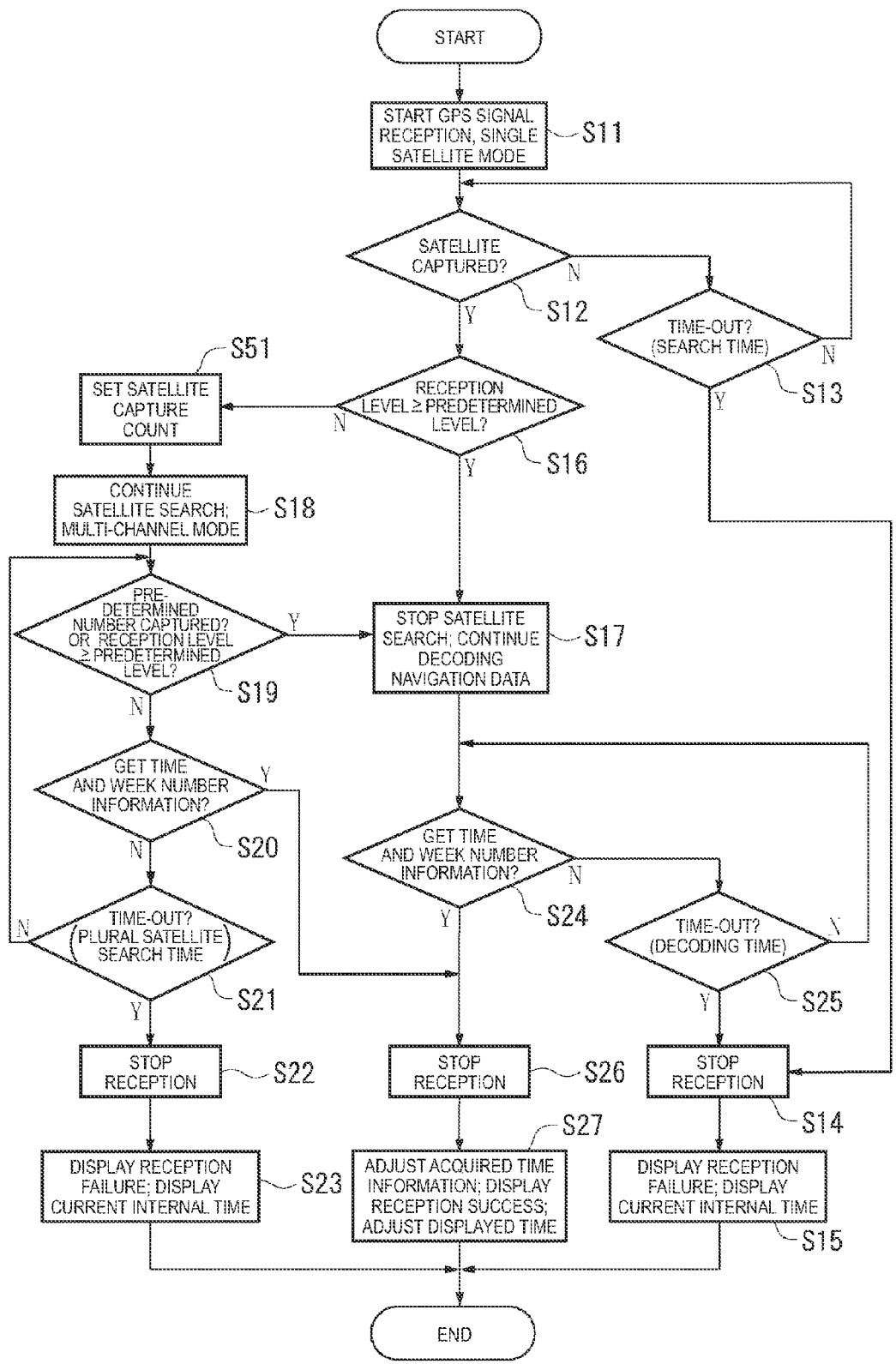
FIG. 10 is a flow chart of the reception process in the fourth embodiment of the invention.

As shown in the flow chart in FIG. 10, the fourth embodiment of the invention differs from the first embodiment in that it sets the number of satellites to capture in the multi-channel mode according to the signal reception level when the reception level is less than a predetermined value (S51). Other aspects of the operation and configuration of this embodiment are the same as in the first embodiment.

The operation of this fourth embodiment is described next with reference to the flow chart in FIG. 10, focusing on the differences between this embodiment and the first embodiment.

Steps S11 to S27 in FIG. 10 are the same as in the first embodiment, and further description thereof is thus omitted.

If the reception level is determined in step S16 to be less than the predetermined level (such as less than −133 dBm), the reception channel setting unit 54 in this fourth embodiment of the invention sets the number of satellites to capture (referred to as the "satellite capture count" below) in step S51.

If the reception level is less than −133 dBm and is greater than or equal to −137 dBm, for example, the reception channel setting unit 54 sets the satellite capture count to the number of capturable satellites divided by 2, for example, in step S51. For example, if the reception circuit has 8 channels, the number of capturable satellites is 8, and the satellite capture count is therefore set to 8/2=4.

However, if the reception level is less than −137 dBm, it is preferable to capture a greater number of GPS satellites 5, and the reception channel setting unit 54 therefore sets the satellite capture count to the maximum number of capturable satellites. For example, if the reception circuit has 8 channels, the maximum number of capturable satellites is 8, and the satellite capture count is therefore also set to 8.

Then in step S19 the satellite capture control unit 51 determines if the number of captured GPS satellites 5 equals the number set in step S51.

Effect of the Fourth Embodiment

The fourth embodiment of the invention also achieves the effects (1) to (3) of the first embodiment described above.

(7) In addition, because the satellite capture count is set in step S51, the average time required to capture the set number of GPS satellites 5 can be shortened, power consumption can therefore be reduced, and the probability of being able to acquire the time and week number information can be improved.

More specifically, if the signal reception level of the GPS satellite 5 captured in the single satellite mode is less than the predetermined level but is a reasonably high level in step S16, the probability of being able to acquire the time and week number information can be improved even if the satellite capture count is reduced in the multi-channel mode. In addition, by reducing the satellite capture count, the reception process can be shortened and power consumption can be reduced compared with capturing the maximum number of satellites that can be captured.

Furthermore, the probability of being able to acquire the time and week number information can be improved when the reception level of the GPS satellite 5 captured in the single satellite mode is low because the satellite capture count used in the multi-channel mode is increased.

It is therefore possible to improve the probability of being able to acquire the time and week number information and also reduce power consumption by setting the satellite capture count in the multi-channel mode based on the signal reception level.

Embodiment 5

A fifth embodiment of the invention is described next.

Figure 11:
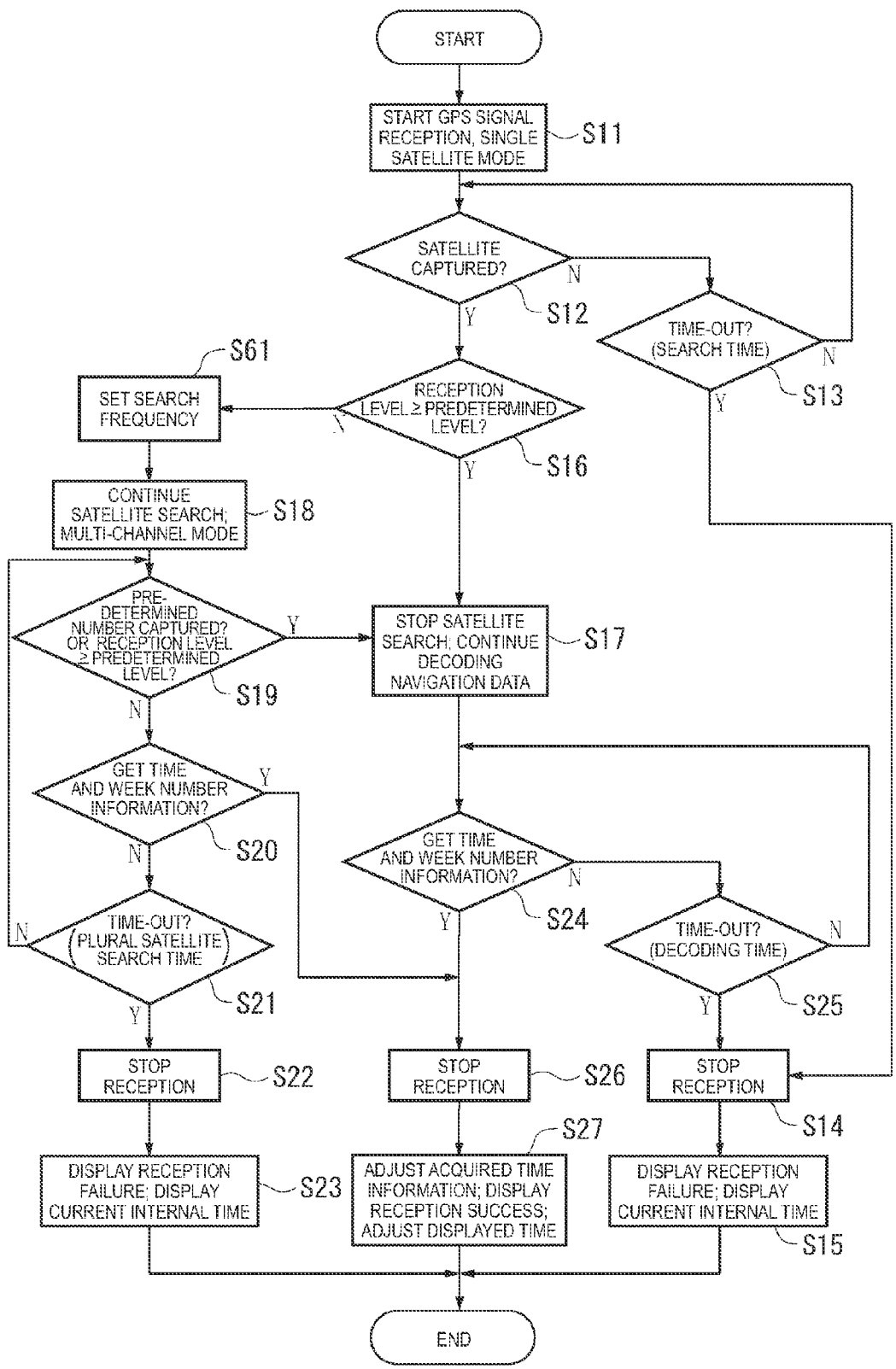
FIG. 11 is a flow chart of the reception process in the fifth embodiment of the invention.

As shown in the flow chart in FIG. 11, the fifth embodiment of the invention differs from the first embodiment in that it sets the search frequency when the reception level is less than the predetermined level, and searches for GPS satellites 5 at the set frequency. Other aspects of the operation and configuration of this embodiment are the same as in the first embodiment.

The operation of this fifth embodiment is described next with reference to the flow chart in FIG. 11, focusing on the differences between this embodiment and the first embodiment.

Steps S11 to S27 in FIG. 11 are the same as in the first embodiment, and further description thereof is thus omitted.

If the reception level is determined in step S16 to be less than the predetermined level (such as less than −133 dBm), the satellite capture control unit 51 in this fifth embodiment of the invention sets the search frequency in step S61.

In step S61 the GPS satellite 5 search is set to three frequency ranges referenced to the transmission frequency f0 (1575.42 MHz) of the GPS satellites 5, specifically, a first frequency range of ±0-1.5 kHz of f0, a second frequency range of ±1.5-3.0 kHz of f0, and a third frequency range of ±3.0-4.5 kHz of f0.

The frequency (transmission frequency) of the satellite signals transmitted from the GPS satellites 5 is the same frequency f0 for all satellites. However, the reception frequency of the receiver varies according to the elevation angle of the GPS satellite 5 to the receiver. This is because the reception frequency varies due to the Doppler effect.

More specifically, when receiving signals from a GPS satellite 5 positioned at the zenith relative to the receiver, the Doppler shift is 0 and the difference between the transmission frequency and the reception frequency is 0.

The Doppler shift (frequency difference) increases as the elevation angle decreases, and the difference to the transmission frequency increases. As the GPS satellite 5 moves closer to the receiver, the Doppler shift changes to the positive, that is, the direction increasing the frequency, and as the GPS satellite 5 moves away from the receiver and disappears over the horizon, the Doppler shift changes to the negative, that is, the direction decreasing the frequency.

GPS satellites 5 at difference elevation angles can therefore be captured by searching for GPS satellites 5 in a plurality of frequency ranges.

In step S18 the satellite capture control unit 51 then continues the satellite search process in the multi-channel mode in the three frequency ranges set in step S61.

GPS satellites 5 at a high elevation angle can therefore be found and captured on the channels for which the search process is set to the first frequency range.

GPS satellites 5 at a middle elevation angle can also be found and captured on the channels for which the search process is set to the second frequency range.

GPS satellites 5 at a low elevation angle can also be found and captured on the channels for which the search process is set to the third frequency range.

If the clock signal for the PLL circuit 34 deviates greatly, a GPS satellite 5 at a low elevation angle may be captured if the frequency is fixed. However, by searching a plurality of frequency ranges, this embodiment of the invention can also search for GPS satellites 5 at a high elevation angle and a middle elevation angle even if the clock signal is offset.

Other aspects of the operation of this embodiment are the same as in the first embodiment.

Effect of the Fifth Embodiment

The fifth embodiment of the invention also achieves the effects (1) to (3) of the first embodiment described above.

(8) In addition, this embodiment of the invention enables searching for GPS satellites 5 at high, middle, and low elevation angles because the search frequency is set to three ranges in step S61. As a result, if a roof blocks access to satellites at the zenith, for example, the time information can be acquired by capturing a GPS satellite 5 located at a lower elevation angle. The effect of the reception environment can therefore be reduced, limitations imposed by the reception location can be reduced, the probability of successful reception can be improved, and power consumption can be reduced.

(9) In addition, GPS satellites 5 at a low elevation angle as well as GPS satellites 5 at middle and high elevation angles can be received even if the clock signal of the PLL circuit 34 is offset. As a result, the probability that a satellite can be captured and the time information can be acquired can be improved, and power consumption can be reduced.

Embodiment 6

A sixth embodiment of the invention is described next.

In this sixth embodiment of the invention the single satellite search mode (single satellite mode) or the plural satellite search mode (multi-channel mode) is selected before the reception process proceeds.

The hardware configuration of this sixth embodiment of the invention is the same as the hardware configuration of the GPS wristwatch 1 shown in FIG. 2, and further description thereof is thus omitted.

System Configuration of the Reception Control Unit

Figure 12:
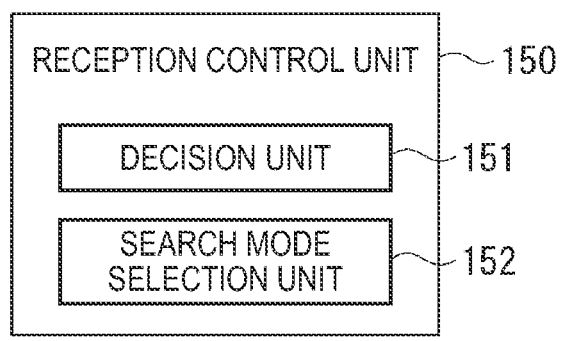
FIG. 12 is a block diagram showing the configuration of the reception control unit in a sixth embodiment of the invention.

The system configuration of the reception control unit 150 in this embodiment of the invention is described with reference to FIG. 12. FIG. 12 shows the function blocks implemented primarily by the control unit 20.

More particularly, the reception control unit 150 includes a decision unit 151 and a search mode selection unit 152.

The decision unit 151 evaluates the reception environment of the GPS wristwatch 1, and in this embodiment of the invention determines if the plural satellite search mode or the single satellite search mode was selected using an external operating member such as the crown 6 or button 7 or 8, or if one of these external operating members was operated.

The search mode selection unit 152 sets the search mode used when the GPS device 40 (reception unit) runs the reception process based on the result supplied from the decision unit 151 to either the single satellite search mode or the plural satellite search mode. In the single satellite search mode the GPS device 40 captures a single GPS satellite 5 and acquires the time information based on the satellite signal transmitted from that GPS satellite 5. In the plural satellite search mode the GPS device 40 captures a plurality of GPS satellites 5, and acquires the time information based on the satellite signal transmitted from one of the plural captured GPS satellites 5.

Time Information Reception Process

The reception operation of the GPS wristwatch 1 in this embodiment of the invention is described next with reference to the flow chart in FIG. 13.

Figure 13:
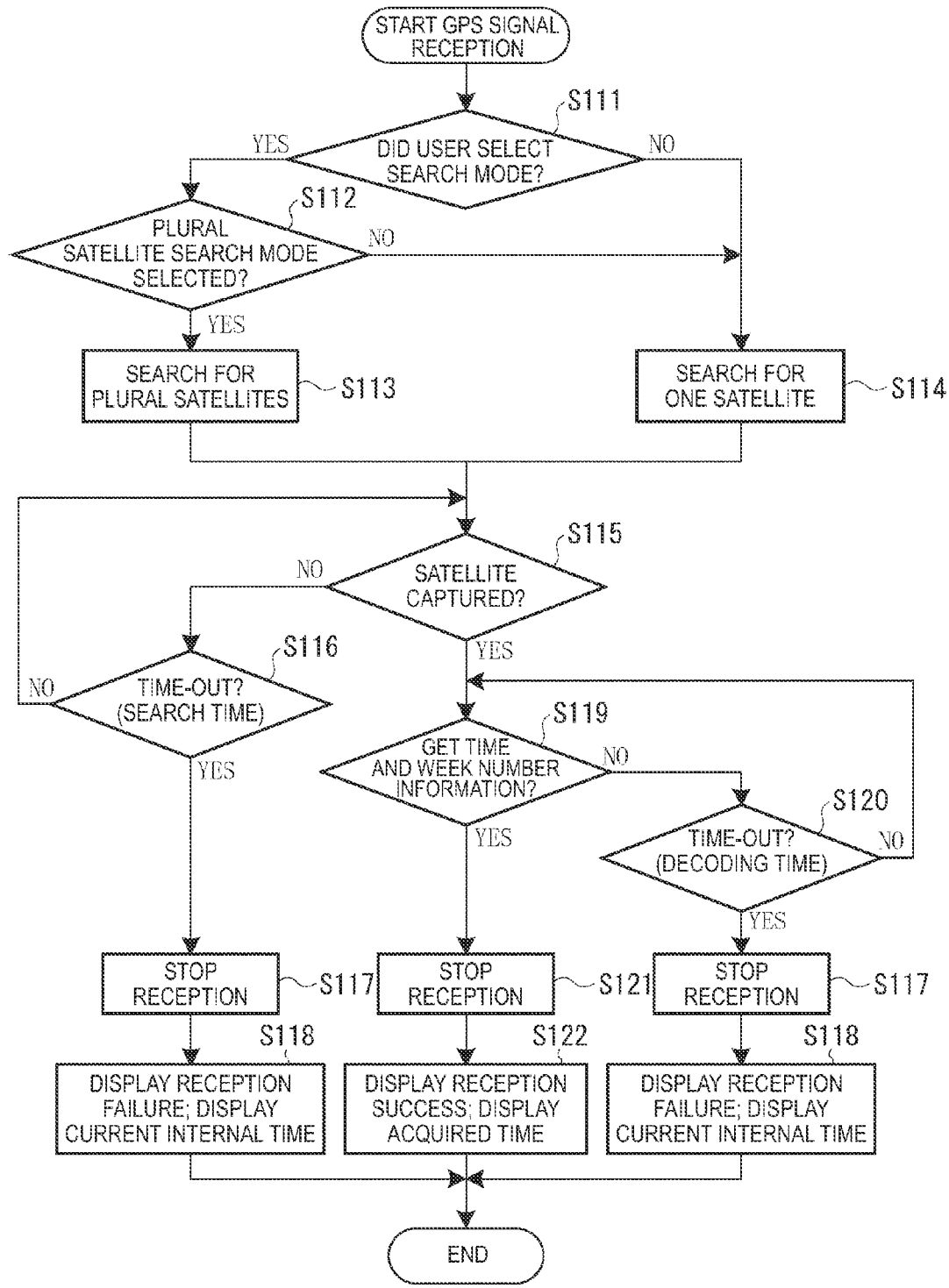
FIG. 13 is a flow chart of the reception process in the sixth embodiment of the invention.

The time information reception process shown in FIG. 13 runs when reception is manually initiated by the user (manual reception process) and at a predetermined reception time (automatic reception process).

This predetermined reception time is typically set to a time such as 2:00 or 3:00 a.m., or 7:00 or 8:00 a.m.

Setting the reception time to 2:00 or 3:00 a.m. is effective because the likelihood is high that the GPS wristwatch 1 is not being used by the user and is removed from the wrist and left stationary indoors at a time when electrical appliance use is minimal and the signal reception environment is best.

Setting the reception time to 7:00 or 8:00 a.m. is also effective because this is the typical time for commuting to work or school, and the likelihood is high that the user is wearing the GPS wristwatch 1 and the GPS wristwatch 1 will be outdoors sometime during this period. More particularly, even if the user is inside a building or factory where satellite signal reception is poor while at work, the user is likely outdoors while commuting, and the likelihood is therefore greater that the signal reception environment is good and the satellite signal can be received.

The preset reception time is not so limited, however, and the user may also set the automatic reception time as desired.

When the time information reception process starts, the decision unit 151 of the reception control unit 150 confirms if the user has selected a search mode (S111). If a search mode was selected, the decision unit 151 determines if the plural satellite search mode was selected (S112).

If the decision unit 151 determines in S112 that the plural satellite search mode was selected, the search mode selection unit 152 sets the plural satellite search mode and executes the time information reception process (S113).

If the decision unit 151 returns No in S111 because the user has not selected a search mode, and returns No in S112 because the user selected the single satellite search mode, the search mode selection unit 152 sets the single satellite search mode and executes the time information reception process (S114).

When the search mode selection unit 152 has set the reception mode of the GPS device 40 to the single satellite search mode, the reception control unit 150 sets the reception channel to one channel and starts receiving the satellite signal transmitted from the GPS satellite 5 (S114).

When the search mode selection unit 152 has set the reception mode of the GPS device 40 to the plural satellite search mode, the reception control unit 150 sets the reception channel to plural channels, such as eight channels, and starts receiving the satellite signals transmitted from the GPS satellites 5 (S113).

The reception processes executed in S113 and S114 are described further below.

The reception control unit 150 controls the GPS device 40 to generate the C/A code pattern of the GPS satellite 5 and start reception in order to receive the GPS signal, that is, the satellite signal, from the GPS antenna 11. The baseband unit 30 then determines the correlation between the C/A code and the received satellite signal to find a GPS satellite 5 with which reception can be synchronized.

The reception control unit 150 then determines if the GPS satellite 5 was captured or not (S115). If in step S115 it is determined that the satellite could not be captured, the reception control unit 150 determines if the satellite capture time (search time) is greater than or equal to a preset time (search timeout determination time), that is, if the search timed out (S116).

The reception control unit 150 determines if the search timed out as described below.

It takes several hundred milliseconds to complete the capture process for one satellite. If the GPS wristwatch 1 has not previously run the satellite capture process and acquired orbit information (almanac data) for all of the satellites, that is, if the GPS wristwatch 1 is operating from a cold start, the GPS wristwatch 1 searches for any GPS satellite 5 it can find. Even if searching starts from GPS satellite 5 No. 1 and a satellite is not captured until GPS satellite 5 No. 30, that is, capturing a satellite takes the longest time, a satellite can be captured in approximately 2 seconds. Therefore, if a satellite cannot be captured by the time the predetermined search timeout time has passed (such as 3 seconds) after reception starts, the reception control unit 150 determines that operation timed out in step S116.

If operation has timed out in step S116, the reception control unit 150 stops the GPS reception process in the GPS device 40 (S117). The reception control unit 150 then indicates on the display 4, for example, that reception failed, and the control unit 20 moves the hands 3 based on the currently stored internal time to display the internal time (S118).

If it is determined in S115 that a satellite was captured, the reception control unit 150 decodes the satellite signal received from the captured GPS satellite 5 and determines if the time and week number information was acquired (S119).

In S119 the reception control unit 150 normally determines if the Z count data and week number (WN) data could be acquired, that is, if the time and week number information could be acquired. However, if it is not necessary to acquire the week number (WN) data because less than one week has passed since the last time the week number (WN) data was acquired, whether the Z count data was acquired may be determined in S119.

If it is determined in step S119 that the time and week number could not be acquired, the reception control unit 150 determines if the navigation data decoding time has reached the time-out limit (S120). More specifically, the reception control unit 150 determines that the reception condition is poor if the time and week number cannot be acquired by the time the predetermined time (decoding time-out determination time) passes after the start of the navigation data decoding process.

This decoding time-out determination time may be set to approximately 12 to 24 seconds if only the Z count, which is transmitted every 6 seconds, is acquired. If the time information is acquired through the week number, which is transmitted every 30 seconds, the decoding time-out determination time may be set to approximately 60 to 120 seconds.

If operation has not timed out in S120, the reception control unit 150 continues determining if the time and week number have been acquired (S119).

If operation has timed out in S120, the reception control unit 150 stops the GPS reception process (S117) and indicates on the display 4, for example, that reception failed, and the control unit 20 moves the hands 3 based on the currently stored internal time to display the internal time (S118).

If it is determined in S119 that the time and week number information were acquired, the reception control unit 150 stops the GPS reception process (S121) and indicates on the display 4, for example, that reception succeeded, and the control unit 20 moves the hands 3 based on the acquired time information to correct the time displayed by the hands 3 (S122).

This embodiment of the invention executes the plural satellite search mode S113 only when the user has manually selected the plural satellite search mode, and otherwise executes the single satellite search mode S114.

Effect of the Sixth Embodiment of the Invention

The effect of this embodiment of the invention is described next. (10) The GPS wristwatch 1 selects either the single satellite search mode or plural satellite search mode based on a user selection and then executes the reception process. As a result, if the user determines that the reception environment is good and the reception level is high because the user is outside, for example, and selects the single satellite search mode, the time and week number information can be acquired in a short time and power consumption can be reduced.

However, if the user decides that the reception environment is poor, such as when receiving signals while indoors or walking around outside, and selects the plural satellite search mode, signals can be received and decoded from the captured satellite with the highest reception level. The probability of being able to acquire the time and week number information can therefore be improved comparing with receiving in the single satellite search mode when the reception environment is poor, the reception time can be shortened compared with the single satellite search mode, and power consumption can be reduced.

Therefore, because the user evaluates the reception conditions and selects either the single satellite search mode or plural satellite search mode according to the reception environment before reception starts in this embodiment of the invention, the average reception time can be shortened, power consumption can be reduced, the probability of being able to acquire the time and week number information can be improved even when the reception environment deteriorates, there are fewer limitations on the reception location, and user convenience can be improved.

If the reception process is run only in the single satellite search mode, the time and week number information can be acquired in a short time and power consumption can be reduced when the reception environment is good and the reception level is high. However, when the reception environment deteriorates and the reception level drops, the probability of being able to acquire the time and week number information also drops, the satellite search process and navigation data decoding process must be repeated, the reception time therefore becomes longer and power consumption increases.

On the other hand, if the reception process runs only in the plural satellite search mode (multi-channel mode), the probability of being able to acquire the time and week number information can be improved even when the reception environment deteriorates and the reception level is low, and the reception time can be shortened and power consumption can be reduced compared with the single satellite search mode. However, when the reception environment is good, power consumption increases compared with the single satellite search mode.

However, by using the decision unit 151 and search mode selection unit 152 to select the single satellite search mode or plural satellite search mode according to the reception level, this embodiment of the invention can shorten the average reception time, reduce power consumption, increase the probability of being able to acquire the time and week number information when the reception environment is poor, reduce the limitations on the reception location, and improve user convenience.

(11) Before the reception process is executed in this embodiment of the invention, the decision unit 151 evaluates the reception environment, and based on this result the search mode selection unit 152 selects the single satellite search mode or plural satellite search mode.

Compared with actually starting the reception process and then dynamically selecting the search mode based on the reception conditions, this embodiment of the invention statically selects the search mode before reception starts, thereby enabling receiving the satellite signal in a short time after reception starts and also reducing power consumption.

(12) Because if the satellite capture process has timed out or not is determined in S116, needlessly continuing the reception process can be prevented when the reception environment is particularly poor and no GPS satellite 5 can be captured, and a system shutdown caused by a drop in the battery voltage due to increased power consumption can be prevented.

In addition, because step S120 determines whether the decoding process has timed out, needlessly continuing the reception and decoding process can be prevented when the reception level is low and the correct time information cannot be acquired. This also prevents a system shutdown caused by a drop in the battery voltage due to increased power consumption.

(13) Because the GPS wristwatch 1 according to this embodiment of the invention is used worn by the user, the reception environment can change easily compared with timepieces such as clocks that are used at a stationary location inside a building, particularly in the city with tall buildings that can easily block signals from the GPS satellites 5 and when the user is walking where receiving signals from a GPS satellite 5 can be difficult.

However, because the user selects the single satellite search mode or plural satellite search mode in the GPS wristwatch 1 according to this embodiment of the invention, the time and week number can be acquired in a short time and power consumption can be reduced. The GPS wristwatch 1 according to this embodiment of the invention is thus particularly suited to a portable timepiece such as a wristwatch or a pocket watch.

(14) Furthermore, this embodiment of the invention selects the single satellite search mode set as the default setting when the user does not specifically select the search mode. Therefore, because the reception process runs in the default single satellite search mode if the user forgets to select the search mode when starting reception, usability is not impaired compared with an arrangement in which the reception process does not run if the user does not expressly select the search mode.

Embodiment 7

A seventh embodiment of the invention is described next.

Figure 14:
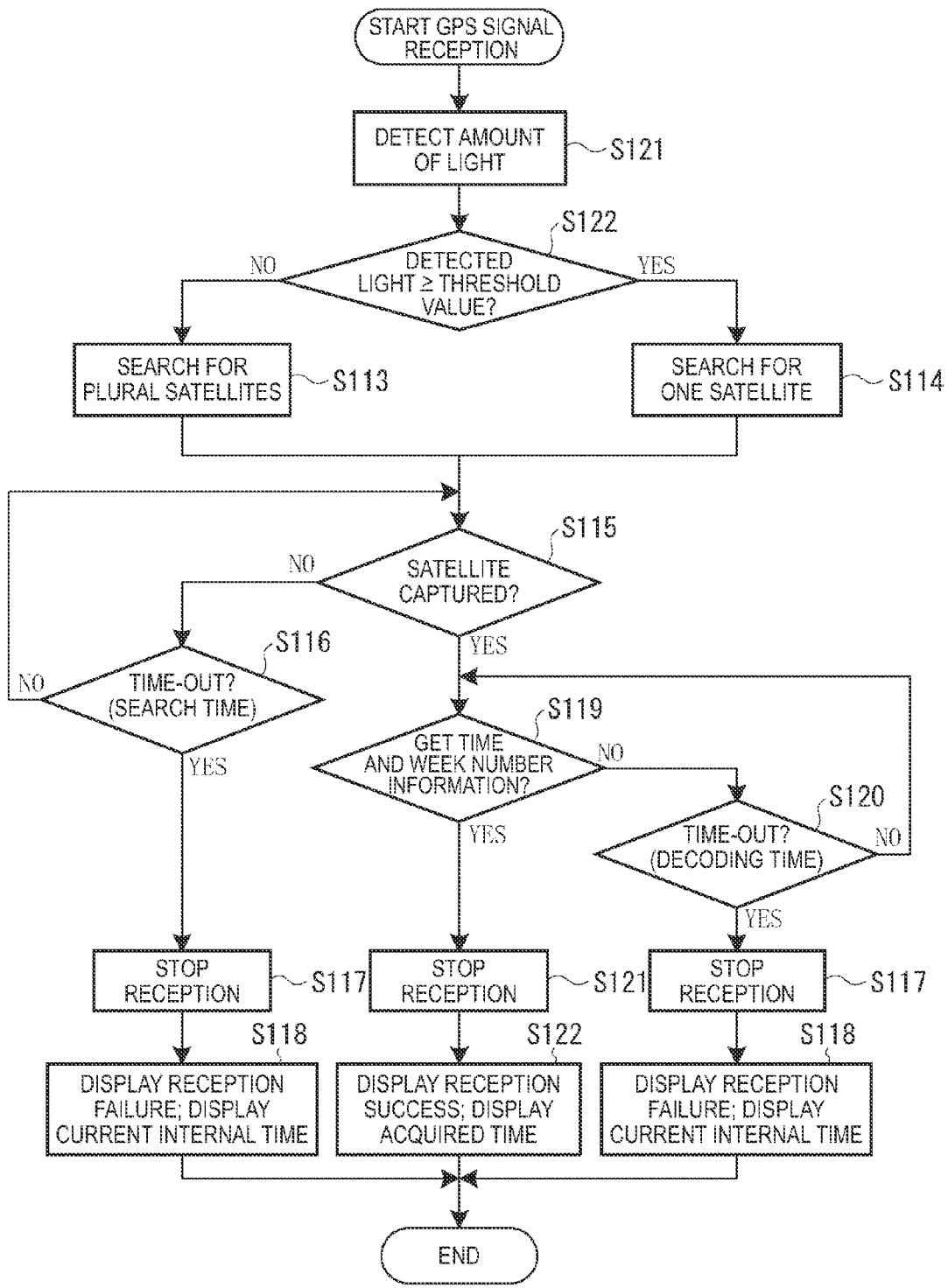
FIG. 14 is a flow chart of the reception process in the seventh embodiment of the invention.

As shown in the flow chart in FIG. 14, this seventh embodiment of the invention executes a light detection process to measure the amount of light incident to the GPS wristwatch 1, and selects the single satellite search mode or plural satellite search mode based on how much light is detected.

The GPS wristwatch 1 according to this embodiment of the invention therefore also has a light measuring unit (not shown in the figure) for measuring how much light is incident to the GPS wristwatch 1.

This light measuring unit may use a light sensor that directly measures the amount of light, but this embodiment of the invention has a solar cell that converts incident light to electrical power and indirectly measures the amount of light from how much power is generated by the solar cell. The GPS wristwatch 1 according to this embodiment of the invention thus has a solar cell for charging the storage battery 24, and a power generation detection unit that detects power generation by the solar cell. This solar cell and power generation detection unit render the light measuring unit.

The operation of this seventh embodiment of the invention is described next with reference to the flow chart in FIG. 14, focusing on the differences with the foregoing sixth embodiment.

When GPS signal reception starts in this seventh embodiment of the invention, the light measuring unit measures the power output from the solar cell (S121).

The decision unit 151 then determines if the power output is greater than or equal to a predetermined level (S122).

More specifically, power output is high when the GPS wristwatch 1 is outdoors during the day and exposed to sunlight, and power output is lower when the GPS wristwatch 1 is exposed to indoor lighting. When outdoors at night, power output is even lower than when exposed to indoor lighting.

Threshold values (predetermined values) for differentiating power output resulting from exposure to sunlight and power output resulting from exposure to indoor lighting are therefore set, and if power output is greater than or equal to this predetermined level, the decision unit 151 determines that the GPS wristwatch 1 is outdoors.

For example, the power output equal to a luminance level of 5000 lx (lux) may be set as a first threshold value because the luminance level will always be 5000 lx or greater when outdoors during the day whether it is sunny or cloudy. The ambient light level when indoors using fluorescent lighting, however, is typically 1000 lx or less. The threshold value used to differentiate outdoor and indoor locations based on the amount of light (luminance) may therefore be set to approximately 5000 lx, and if the luminance level is determined indirectly based on power output, indoor and outdoor locations can be determined by setting a power generation threshold value equivalent to this amount of light.

If the decision unit 151 returns No in S122, the search mode selection unit 152 selects the plural satellite search mode and then runs the time information reception process (S113).

If the decision unit 151 returns Yes in S122, the search mode selection unit 152 selects the single satellite search mode and then runs the time information reception process (S114).

Steps S115 to S122 are the same as in the sixth embodiment, and further description thereof is thus omitted.

Effect of the Seventh Embodiment

The seventh embodiment of the invention also achieves the same effects as the sixth embodiment described above.

(15) In addition, because the seventh embodiment also has a light measuring unit, the GPS wristwatch 1 can determine if it is outdoors. The GPS wristwatch 1 can therefore automatically determine if the reception environment is good, and can appropriately select the single satellite search mode for the reception process.

Furthermore, if the measured amount of light is less than the predetermined threshold value, the GPS wristwatch 1 can automatically determine that the reception environment is poor, such as being indoors, and can select the plural satellite search mode for the reception process.

This embodiment of the invention can therefore automatically and easily evaluate the reception environment by measuring the amount of ambient light. In addition, because the single satellite search mode or plural satellite search mode is selected according to the reception conditions, the average reception time can be shortened, power consumption can be reduced, the probability of being able to acquire the time and week number information can be improved even when the reception environment deteriorates, there are fewer limitations on the reception location, and user convenience can be improved.

Embodiment 8

An eighth embodiment of the invention is described next.

The GPS wristwatch 1 according to this eighth embodiment of the invention stores satellite orbit information (almanac data) in the storage unit 20A. The satellite orbit information (almanac) is received from a satellite signal once a week, for example.

Figure 15:
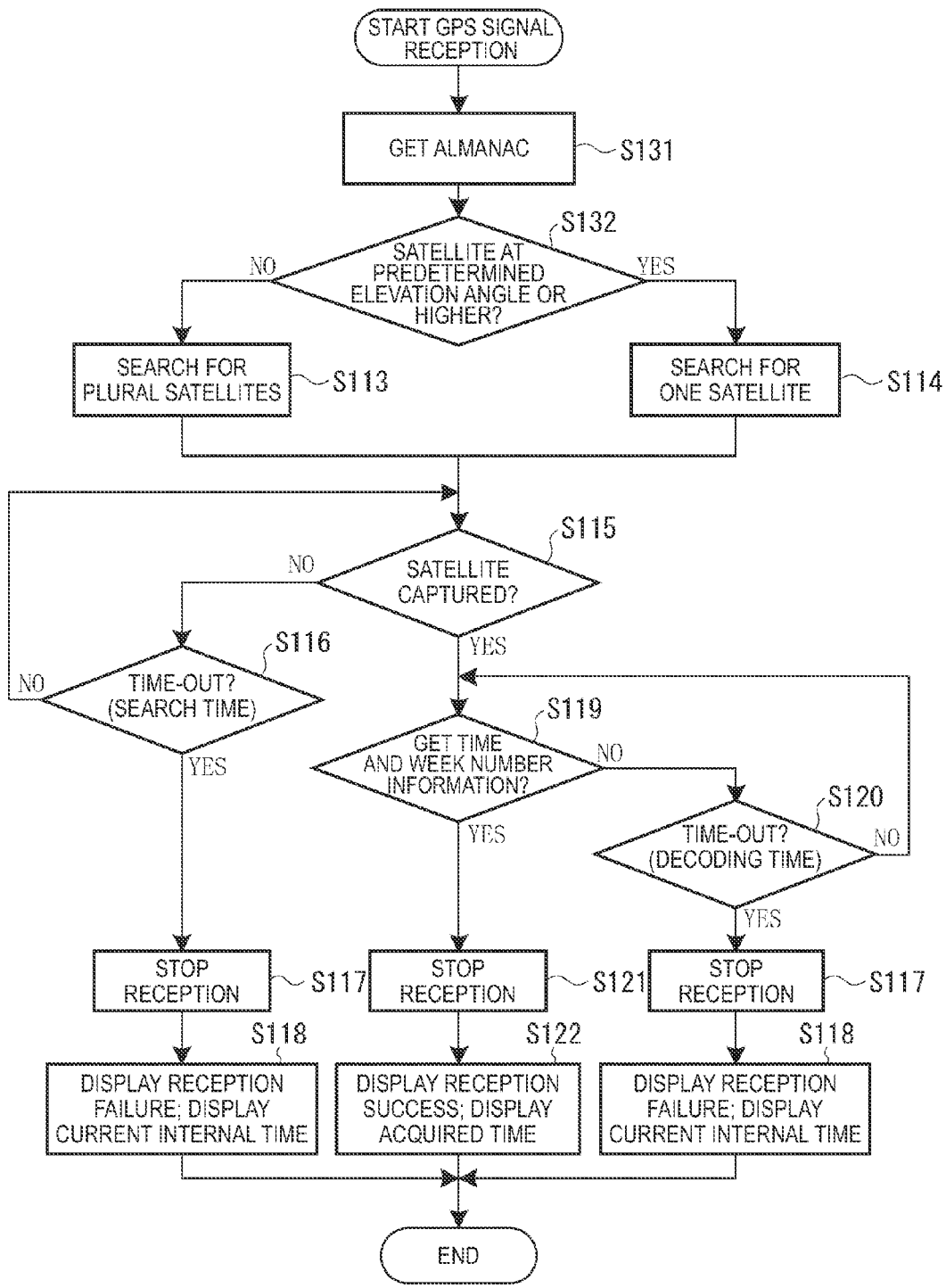
FIG. 15 is a flow chart of the reception process in the eighth embodiment of the invention.

As shown in the flow chart in FIG. 15, the decision unit 151 runs a process to get the orbit information for GPS satellites 5 from which the satellite signal can currently be captured based on the current time, location, and satellite orbit information, and detects the elevation angle of each GPS satellite 5 (S131).

The current time can be acquired by reading the time of the internal clock in the GPS wristwatch 1.

The location is the current location acquired by receiving satellite signals from a plurality of GPS satellites 5 and running a positioning information acquisition process to get the current location. This positioning information acquisition process is manually started by the user such as when travelling overseas or to a different time zone.

The decision unit 151 then determines if there is a predetermined number of GPS satellites 5 at a high elevation angle that is greater than or equal to a predetermined angle (S132). In S132 the decision unit 151 determines, for example, if there are at least three GPS satellites 5 at an elevation angle of 60 degrees or more.

If the decision unit 151 returns No in S132, the search mode selection unit 152 selects the plural satellite search mode and then runs the time information reception process (S113).

If the decision unit 151 returns Yes in S132, the search mode selection unit 152 selects the single satellite search mode and then runs the time information reception process (S114).

Steps S115 to S122 are the same as in the sixth embodiment, and further description thereof is thus omitted.

Effect of the Eighth Embodiment

The eighth embodiment of the invention also achieves the same effects as the sixth embodiment described above.

(16) In addition, because orbit information for all GPS satellites 5 (the almanac) is stored in the storage unit 20A, whether there are a predetermined number of GPS satellites 5 at an elevation angle that is greater than or equal to a predetermined angle from which signals can be currently received can be determined before reception starts, and whether the reception environment is good or not can therefore be easily determined.

Therefore, because the reception environment can be automatically evaluated based on the satellite orbit information, and the single satellite search mode or plural satellite search mode can be set according to the reception environment, the average reception time can be shortened, power consumption can be reduced, the probability of being able to acquire the time and week number information can be improved even when the reception environment deteriorates, there are fewer limitations on the reception location, and user convenience can be improved.

Embodiment 9

A ninth embodiment of the invention is described next with reference to FIG. 16.

The GPS wristwatch 1 according to this ninth embodiment of the invention has a reception level detection unit that detects the satellite signal reception level, and the reception level previously detected by the reception level detection unit is stored in the storage unit 20A.

Figure 16:
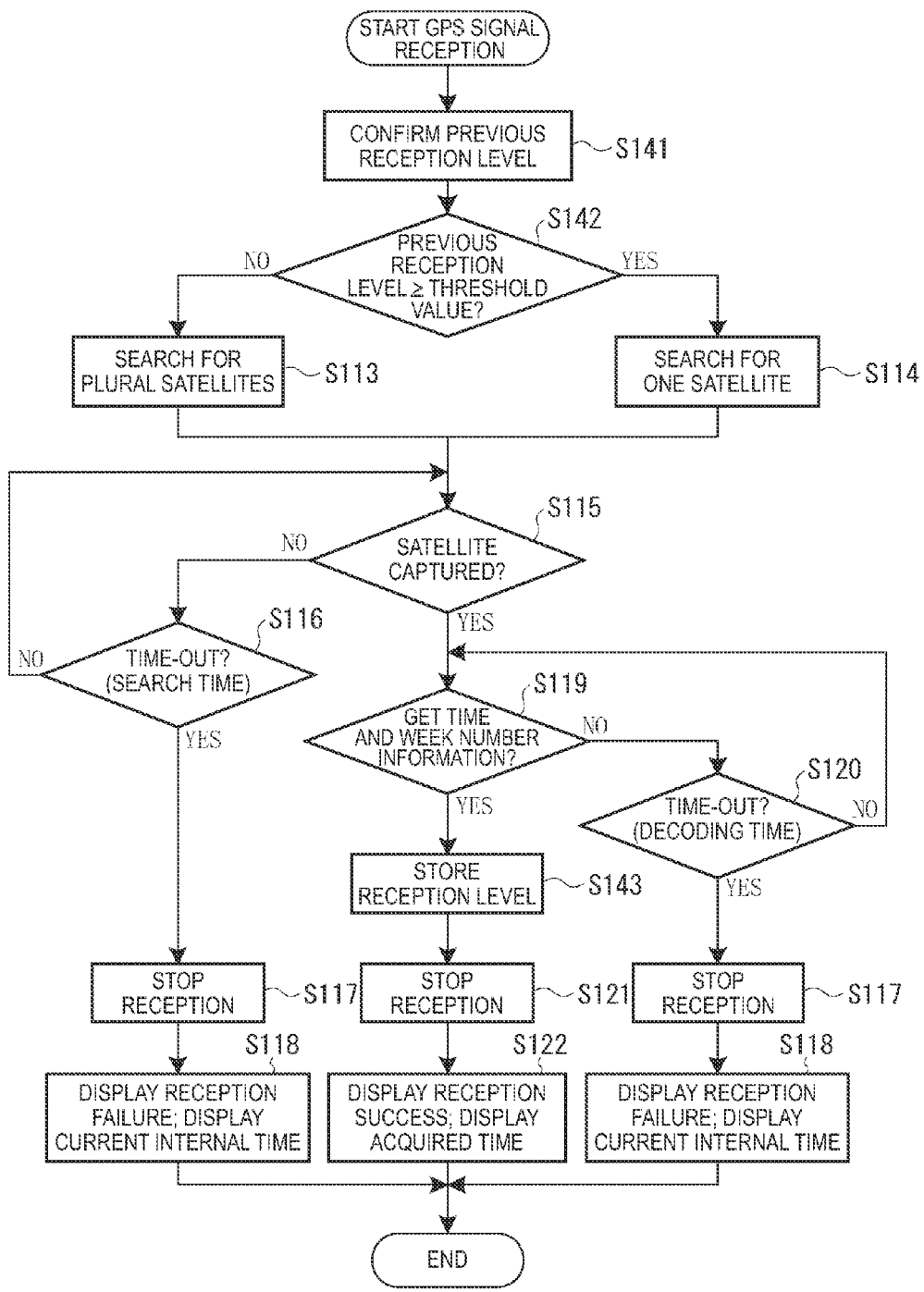
FIG. 16 is a flow chart of the reception process in the ninth embodiment of the invention.

As shown in the flow chart in FIG. 16, the decision unit 151 gets the previous reception level from the storage unit 20A before continuing with the reception process (S141).

The decision unit 151 then determines if the previous reception level is greater than or equal to a predetermined level (S142), such as whether the previous reception level is greater than or equal to −133 dBm.

If the decision unit 151 returns No in S142, the search mode selection unit 152 selects the plural satellite search mode and then runs the time information reception process (S113).

If the decision unit 151 returns Yes in S142, the search mode selection unit 152 selects the single satellite search mode and then runs the time information reception process (S114).

Steps S115 to S122 are the same as in the sixth embodiment, and further description thereof is thus omitted.

Note that the reception level at which the reception control unit 150 successfully acquires the time and week number information in S119 is stored in the storage unit 20A (S143).

Effect of the Ninth Embodiment

The ninth embodiment of the invention also achieves the same effects as the sixth embodiment described above.

(17) In addition, because the previous reception level is stored in the storage unit 20A and the reception environment is evaluated by determining if the previous reception level is greater than or equal to a predetermined level, whether the reception environment is good or not can be easily determined before reception starts.

Therefore, because the reception environment can be automatically evaluated based on the previous reception level and the single satellite search mode or plural satellite search mode is selected according to the reception environment, the average reception time can be shortened, power consumption can be reduced, the probability of being able to acquire the time and week number information can be improved even when the reception environment deteriorates, there are fewer limitations on the reception location, and user convenience can be improved.

Other Variations of the Invention

The invention is not limited to the embodiments described above.

For example, the GPS wristwatch 1 may also have a speed detection unit that detects how fast the GPS wristwatch 1 is moving. An acceleration sensor or other type of speed sensor may be used for this speed detection unit. If acceleration is measured, for example, the user is determined to be walking if the maximum acceleration per unit time when the case oscillates on two perpendicular axes is greater than or equal to a threshold value of 0.98 m/s$^2$ (0.1 G), and the GPS wristwatch 1 is determined to be stationary if acceleration is less than this threshold value. More specifically, when the timepiece is worn on the wrist and the user is walking or jogging, the maximum acceleration of the case is 4.9-9.8 m/s$^2$ (0.5-1.0 G). Whether the timepiece is moving or is stationary can therefore be determined from whether the measured maximum acceleration is greater than or equal to this threshold value.

If such a speed detection unit is provided and the detected speed is less than or equal to the predetermined threshold value, the reception environment is likely better than if the detected speed is greater than the predetermined value. That is, when a satellite signal is received from a GPS satellite 5, receiving the satellite signal becomes difficult if the relative positions of the GPS satellite 5 and the GPS wristwatch 1 change. Because the reception environment therefore deteriorates if the speed at which the GPS wristwatch 1 is moving increases, the plural satellite search mode affording higher reception sensitivity is selected when the detected speed is greater than or equal to the predetermined threshold value, and the single satellite search mode is selected if the detected speed is less than the threshold value. As a result, the average reception time can be shortened, power consumption can be reduced, the probability of being able to acquire the time and week number information can be improved even when the reception environment deteriorates, there are fewer limitations on the reception location, and user convenience can be improved.

In another aspect of the invention the GPS wristwatch 1 stores how long the reception process took (the reception time) in the storage unit 20A, and when the reception process starts the decision unit 151 reads the previous reception time from the storage unit 20A. The single satellite search mode is selected if the reception time is less than or equal to a predetermined time (threshold value), and the plural satellite search mode is selected if the reception time is longer than the predetermined time.

The reception environment was good if the previous reception time was short, and the possibility that the current reception environment is also good is high. That is, when the reception process runs automatically, the next time the reception process runs automatically is normally at the same time and the reception environment is therefore typically the same. When reception is triggered automatically, the user also typically starts reception in the same reception environment.

Therefore, whether the reception process is run automatically or is started by the user, the previous reception environment and the current reception environment are often the same. Therefore, if the previous reception time was short, the likelihood is high that the reception environment will also be good the next time the reception process starts, and the single satellite search mode can be selected. However, if the previous reception time was long, the likelihood is high that the reception environment will also be poor the next time the reception process starts, and the plural satellite search mode can be selected.

The threshold value for evaluating the reception time may be set to 1 minute when receiving only the Z count data, and may be set to 3 minutes when also receiving calendar information including the week number. As described above, because the Z count data can be received at 6-second intervals, the reception environment can be determined to be poor if the reception time is longer than one minute. Furthermore, because the week number can be received at 30-second intervals, reception may take longer than one minute even if the reception environment is good depending on when reception starts. The threshold value is therefore preferably set longer than when receiving only the Z count data, and may be set to 3 minutes, for example.

The method of evaluating the reception environment may combine various methods described in the different embodiments and variations of the invention described above. For example, evaluation based on detecting the amount of light and evaluation based on detecting the speed may be combined. In this situation, if the detected amount of light exceeds the threshold value and the GPS wristwatch 1 is determined to be outdoors, but the detected speed also exceeds the threshold value and the GPS wristwatch 1 is determined to be moving, the reception environment may be determined to be not be good and the plural satellite search mode may be selected for reception.

The sixth to ninth embodiments of the invention described above may also be configured to always select the plural satellite search mode the first time that the time is received after the power is turned on regardless of the result returned by the decision unit 151.

Because the probability is high that the time shown by the timepiece deviates from the actual time immediately after the power turns on, it is necessary to reliably receive the time information. Therefore, by selecting the plural satellite search mode the first time the time is received after the power turns on, the probability of being able to reliably acquire the time information can be improved and the time displayed by the GPS wristwatch 1 can be set accurately.

The actual time used as the time-out determination time (the search time-out determination time, plural search time-out determination time, and decoding time-out determination time) in each of the foregoing embodiments is not limited to the times described above, and may be set appropriately in each embodiment.

The threshold values used in the foregoing embodiments and variations of the invention are also not limited to the specific values described above, and may be set to values that enable detecting each of the conditions described above.

A timekeeping device according to the present invention is not limited to devices that can be incorporated in a GPS wristwatch 1. The timekeeping device of the invention may, for example, be incorporated in a cell phone.

The foregoing embodiments are described with reference to a GPS satellite, but the invention is not limited to GPS satellites and can be used with Global Navigation Satellite Systems (GNSS) such as Galileo and GLONASS, and other positioning information satellites that transmit satellite signals containing time information, including the SBAS and other geostationary or quasi-zenith satellites.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention to the extent that they fall within the appended claims.

What is claimed is:

1. A timekeeping device, comprising:
    a reception unit that receives a satellite signal transmitted from a positioning information satellite;
    a time information generating unit that generates time information based on the received satellite signal;
    a time display unit that displays the time information; and
    a reception control unit that controls the reception unit;
    wherein the reception control unit includes
        a signal condition detection unit that detects a signal condition of the received satellite signal, and
        a reception setting unit that sets the reception unit to a single satellite mode or a multi-satellite mode based on the detected signal condition.

2. The timekeeping device described in claim 1, wherein the reception setting unit sets the reception unit to the signal satellite mode at a start of a reception process.

3. The timekeeping device described in claim 2, wherein the reception setting unit switches to the multi-satellite mode when a signal strength of the received satellite signal is less than a predetermined threshold.

4. The timekeeping device described in claim 2, wherein the reception setting unit switches to the multi-satellite mode when the time information cannot be generated within a time duration.

5. The timekeeping device described in claim 4, wherein the reception setting unit sets the time duration based on a signal strength of the received satellite signal.

6. The timekeeping device as described in claim 1, wherein the reception unit receives a plurality of satellite signals in the multi-satellite mode, and the reception control unit stops a reception process when the time information generating unit generates the time information based on at least one received satellite signal.

7. The timekeeping device as described in claim 1, further comprising:
    an internal time information generating unit that generates internal time information; and
    a time information adjusting unit that adjusts the internal time information based on the time information.

* * * * *